United States Patent
Sasanuma et al.

(10) Patent No.: US 6,291,596 B1
(45) Date of Patent: Sep. 18, 2001

(54) CATALYST AND PROCESS FOR HYDROGENATING OLEFINICALLY UNSATURATED COMPOUND

(75) Inventors: Hiroyuki Sasanuma; Motokazu Takeuchi; Iwakazu Hattori, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/353,007

(22) Filed: Jul. 13, 1999

(30) Foreign Application Priority Data

Jul. 24, 1998 (JP) .................................................. 10-209162

(51) Int. Cl.$^7$ ....................................................... C08F 8/04
(52) U.S. Cl. .................. 525/338; 525/332.8; 525/332.9; 525/333.1; 525/333.2; 525/339
(58) Field of Search ...................... 525/338, 339

(56) References Cited

U.S. PATENT DOCUMENTS

| 4,501,857 | 2/1985 | Kishimoto et al. . |
| 4,980,421 | 12/1990 | Teramoto et al. . |
| 5,270,274 | 12/1993 | Hashiguchi et al. . |
| 5,583,185 | 12/1996 | Parellada Ferrer et al. . |

FOREIGN PATENT DOCUMENTS

| 41 06 466 | 9/1991 | (DE) . |
| 339986 | 4/1989 | (EP) . |
| 0 434 469 | 6/1991 | (EP) . |
| 544304 | 2/1993 | (EP) . |
| 601953 | 2/1994 | (EP) . |
| 0 810 231 | 12/1997 | (EP) . |
| 2134909 | 3/1984 | (GB) . |
| 61-028507 | 1/1986 | (JP) . |
| 61-047706 | 1/1986 | (JP) . |
| 2-051503 | 1/1990 | (JP) . |
| 6-220122 | 3/1994 | (JP) . |
| 6-220123 | 3/1994 | (JP) . |
| WO 96/18655 | 6/1996 | (WO) . |

OTHER PUBLICATIONS

"EPR Study of Hydride Complexes of Bis(cyclopentadienyl)titanium . . . ", Saraev et al, Inst. Nefte–Uglekhim. Sint., (1977), 3(9), 1364–72.*

* cited by examiner

Primary Examiner—Bernard Lipman
(74) Attorney, Agent, or Firm—Oblon, Spivak, McClelland, Maier & Neustadt, P.C.

(57) ABSTRACT

A hydrogenation catalyst comprising (A) a transition metal compound in which a group having a heterocyclic skeleton is bonded to Ti, Zr or Hf through an oxygen atom or a nitrogen atom, a representative of which compound is bis(cyclopentadienyl)titanium bis(tetrahydrofurfuryloxy) and (B) an organic compound, halide or hydride of a metal of Groups I to III of the Periodic Table or comprising the constituent (A), the constituent (B) and (C) a polar, organic compound such as an alcohol, a carboxylic acid or the like. An olefinically unsaturated compound can be hydrogenated with a high efficiency by contacting the compound with hydrogen in the presence of the above catalyst in an inert, organic solvent. The above catalyst has a very high catalytic activity, is excellent in hydrogenation selectivity and thermal resistance, also excellent in storage stability and maintainability of catalytic activity and is hardly affected by the co-existing impurities.

28 Claims, No Drawings

CATALYST AND PROCESS FOR HYDROGENATING OLEFINICALLY UNSATURATED COMPOUND

BACKGROUND OF THE INVENTION

This invention relates to a novel catalyst for hydrogenating an olefinically unsaturated compound, which catalyst has a very high catalytic activity and is excellent in thermal resistance, storage stability and maintainability of catalytic activity and to a process for hydrogenating an olefinically unsaturated compound using the above hydrogenation catalyst.

Olefinically unsaturated polymers, representatives of which are conjugated diene polymers, have widely been used as elastomers and the like in industry. In these olefinically unsaturated polymers, however, their unsaturated bonds cause the deterioration of the weather resistance, thermal resistance and the like of the polymers though the unsaturated bonds can be utilized in vulcanization and the like. As a result, the unsaturated bonds bring about such a disadvantage that the application of the polymers is limited.

On the other hand, the weather resistance, thermal resistance and the like of the olefinically unsaturated polymer can be remarkably improved by hydrogenating the olefinically unsaturated bonds to convert the unsaturated polymer chains to saturated ones. As a hydrogenation catalyst to be used in the hydrogenation of the olefinically unsaturated polymers for the above purpose, there have heretofore been known heterogeneous system catalysts in which a metal such as nickel, platinum, palladium or the like has been supported on a carrier such as carbon, silica, alumina or the like and homogeneous system catalysts each composed of an organometallic compound whose metal is nickel, cobalt, titanium or the like and a reducing organometallic compound whose metal is aluminum, magnesium, lithium or the like.

The heterogeneous system hydrogenation catalyst is generally lower in catalytic activity than the homogeneous system hydrogenation catalyst and requires such sever conditions as high temperature and high pressure for sufficient hydrogenation reaction. Moreover, the hydrogenation reaction with the heterogenous system hydrogenation catalyst proceeds only when a compound to be hydrogenated is contacted with the catalyst; however, in the case of hydrogenating a polymer, the influence of the viscosity of a reaction system, the steric hindrance in the polymer chain and the like on the hydrogenation is greater than in the case of hydrogenating a low molecular weight compound, and hence, the contact of the polymer with the catalyst becomes difficult in some cases.

Accordingly, in order to hydrogenate olefinically unsaturated polymers with a great efficiency using a heterogeneous system hydrogenation catalyst, a large amount of the catalyst is required, which is uneconomical. At the same time, it is necessary to conduct the reaction at a higher temperature under higher pressure. Therefore, such problems are caused that the decomposition and gelation of polymer become easy to cause and the energy cost becomes high. In addition, when the hydrogenation conditions become severer, in the case of a copolymer of a conjugated diene with a vinyl aromatic compound such as styrene/butadiene rubber (SBR), there are such disadvantages that even the unsaturated bonds of the aromatic nucleus are hydrogenated and that it is difficult to selectively hydrogenate the conjugated diene portions.

On the other hand, the homogeneous system hydrogenation catalyst mentioned above is more advantageous than the heterogeneous hydrogenation catalyst in that the catalytic activity is generally higher, the amount of catalyst used is smaller and the reaction can be conducted under milder conditions. Moreover, when the hydrogenation conditions are selected adequately, even in the case of copolymerization of a conjugated diene with a vinyl aromatic compound, it becomes possible to selectively hydrogenate the conjugated diene portion.

However, in the case of the heterogeneous system hydrogenation catalyst, the activity is greatly varied depending upon the reduction state of the catalyst and hence there are such problems that the reproducibility is low and it is difficult to stably obtain a polymer having a high degree of hydrogenation. In addition, the catalyst constituents tend to be inactivated with the coexisting impurities and the like and this becomes a factor for the heterogeneous system hydrogenation catalyst to be poor in reproducibility. Moreover, it cannot be said that with the conventional homogeneous hydrogenation catalyst, the reaction velocity is sufficiently high and there is also such a problem that the reaction velocity is further lowered by the deterioration of catalytic activity resulting from impurities and reduction state of catalyst. In addition, these disadvantages have become a great obstacle to industrial utilization of the homogeneous hydrogenation catalyst.

Therefore, the fact is that a development has been strongly desired of a hydrogenation catalyst which has a high catalytic activity and is little affected by the co-existing impurities and with which a polymer having a high degree of hydrogenation can be stably obtained without being affected by the conditions for preparing the catalyst.

Now, several hydrogenation catalysts have been known in which a bis(cyclopentadienyl or its derivative) compound of a transition metal is used as one of the constituents, and, for example, M. F. Sloan et al., J. Am. Chem. Soc., 85, 4014–4018 (1965); Y. Tajima et al., J. Org. Chem., 33, 1689–1690 (1968); U.S. Pat. No. 4,501,857; JP-A-61 (1986)-28,507; JP-A-1 (1989)-275,605; JP-A-2 (1990)-51, 503; U.S. Pat. No. 5,583,185; and the like propose a system composed of bis(cyclopentadienyl)titanium dichloride and an organoaluminum compound or organiolithium compound; a system composed of a bis(cyclopentadienyl) titanium dialkyl and an organolithium compound; a system composed of bis(cyclopentadienyl)titanium diphenyl and an organolithium compound; a system composed of bis (cyclopentadienyl)titanium dibenzyl and an organometallic compound whose metal is of Groups I to III of the Periodic Table; a system composed of a bis(cyclopentadienyl) titanium di(alkoxyphenyl) or bis(cyclopentadienyl)titanium bis(diphenylphosphinomethylene) and an organolithium compound, organomagnesium compound or organoaluminum compound; and the like. However, these hydrogenation catalysts cannot satisfy sufficiently the above-mentioned desire.

Furthermore, U.S. Pat. No. 4,501,857 proposes a system composed of a bis(cyclopentadienyl)titanium dialkoxy or a bis(cyclopentadienyl)titanium diaryloxy and an organolithium compound, too. However, with these catalysts, the number of carbon atoms of the alkoxy group or aryloxy group bonded to the titanium atom is limited to 8 or less, and in particular, a development has been desired of a novel homogeneous system hydrogenation catalyst having a further improved catalytic activity.

Moreover, U.S. Pat. No. 5,270,274; JP-A-6-220,122; JP-A-6-220,123 and the like propose hydrogenation catalysts comprising substantially an aluminum component.

However, aluminum-free catalyst systems have been desired in industry. Incidentally, U.S. Pat. No. 4,980,421 also describes examples in which a catalyst system containing no aluminum component [a system composed of a steric hindrance phenoxylithium compound and bis (cyclopentadienyl)titanium dichloride] is used, but in the case of this catalyst system, as shown in Comparative Example 6 described hereinafter, the catalytic activity cannot be said to be always sufficient. In addition, the catalyst tends to be deactivated at a high temperature not lower than 90° C. and hence has an industrial problem. Therefore, a development has been also desired of a hydrogenation catalyst which is free of aluminum but has a high catalytic activity and is not deactivated even under such high temperature conditions.

SUMMARY OF THE INVENTION

This invention has been made against the background of the above-mentioned technical problems of prior art.

An object of this invention is to provide a novel hydrogenation catalyst which has a very high catalytic activity, is excellent in hydrogenation selectivity and thermal resistance, also excellent in storage stability and maintainability of catalytic activity, and is hardly affected by the co-existing impurities.

Another object of this invention is to provide a process for hydrogenating an olefinically unsaturated compound with the above hydrogenation catalyst.

Other objects and advantages of this invention will become apparent from the following description.

According to this invention, there is firstly provided a catalyst for hydrogenating an olefinically unsaturated compound, which catalyst comprises the following constituent (A) (the above catalyst is referred to hereinafter as the first invention):

Constituent (A): At least one member selected from the group consisting of compounds represented by the following general formulas (1) and (2):

(1)

wherein $M^1$ represents a titanium atom, a zirconium atom or a hafnium atom; each of $X^1$ and $X^2$ represents independently a monovalent hydrocarbon group having 5 to 20 carbon atoms and having a cyclopendadiene skeleton and is bonded to $M^1$ in its cyclopentadiene skelton portion; $Y^1$ represents a halogen atom or a monovalent organic group having 3 to 20 carbon atoms and having a heterocyclic skeleton which group is bonded to $M^1$ through an oxygen atom or a nitrogen atom thereof; and $Y^2$ represents a monovalent organic group having 3 to 20 carbon atoms and having a heterocyclic skeleton which group is bonded to $M^1$ through an oxygen atom or a nitrogen atom thereof.

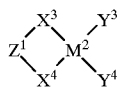
(2)

wherein $M^2$ represents a titanium atom, a zirconium atom or a hafnium atom; each of $X^3$ and $X^4$ represents independently a divalent hydrocarbon group having 5 to 20 carbon atoms and having a cyclopentadiene skeleton and is bonded to $M^2$ in its cyclopentadiene skelton portion; $Z^1$ represents a divalent hydrocarbon group having 1 to 3 carbon atoms, a (poly)silylene group having 1 to 3 silicon atoms or a (poly)siloxanylene group having 1 to 3 silicon atoms; $Y^3$ represents a halogen atom or a monovalent organic group having 3 to 20 carbon atoms and having a heterocyclic skeleton which group is bonded to $M^2$ through an oxygen atom or a nitrogen atom thereof; and $Y^4$ represents a monovalent organic group having 3 to 20 carbon atoms and having a heterocyclic skeleton which group is bonded to $M^2$ through an oxygen atom or a nitrogen atom thereof.

According to this invention, there is secondly provided a catalyst for hydrogenating an olefinically unsaturated compound, which catalyst comprises the above-mentioned constituent (A) and the following constituent (B) (the above catalyst is referred to hereinafter as the second invention):

Constituent (B): At least one member selected from the group consisting of organic compounds, halides and hydrides of metals of Groups I to III of the Periodic Table.

According to this invention, there is thirdly provided a catalyst for hydrogenating an olefinically unsaturated compound, which catalyst comprises (A') a constituent obtained by subjecting to reaction at least one compound represented by the following general formula (4) or (5) and at least one compound represented by the following general formula (3) obtained by the reaction of a heterocyclic compound having 3 to 20 carbon atoms and having a hydroxyl group, a carbonyl group or a secondary amino group with lithium hydride or an organolithium compound (the above catalyst is referred to hereinafter as the third invention):

wherein $Y^5$ represents a monovalent organic group having 3 to 20 carbon atoms and having a heterocyclic skeleton which group is bonded to the lithium atom through an oxygen atom or a nitrogen atom thereof.

(4)

wherein $M^3$ represents a titanium atom, a zirconium atom or a hafnium atom; each of $X^5$ and $X^6$ represents independently a monovalent hydrocarbon group having 5 to 20 carbon atoms and having a cyclopendadiene skeleton and is bonded to $M^3$ in its cyclopentadiene skelton portion; each of $A^1$ and $A^2$ represents independently a chlorine atom, a bromine atom or an iodine atom.

(5)

wherein $M^4$ represents a titanium atom, a zirconium atom or a hafnium atom; each of $X^7$ and $X^8$ represents independently a divalent hydrocarbon group having 5 to 20 carbon atoms and having a cyclopentadiene skeleton and is bonded to $M^4$ in its cyclopentadiene skelton portion; $Z^3$ represents a divalent hydrocarbon group having 1 to 3 carbon atoms, a (poly)silylene group having 1 to 3 silicon atoms or a (poly)siloxanylene group having 1 to 3 silicon atoms; and each of $A^3$ and $A^4$ represents independently a chorine atom, a bromine atom or an iodine atom.

According to this invention, there is fourthly provided a catalyst for hydrogenating an olefinically unsaturated compound, which catalyst comprises the above constituent (A') and the above constituent (B) (the above catalyst is referred to hereinafter as the fourth invention).

According to this invention, there is fifthly provided a catalyst for hydrogenating an olefinically unsaturated compound, which catalyst comprises the above constituent (A) and/or the above constituent (A'); the above constituent (B); and (C) at least one member selected from the group consisting of alcohol compounds, carboxylic acid compounds, chain ester compounds, lactone compounds, ether compounds, thioether compounds, ketone compounds, aldehyde compounds, sulfoxide compounds, amine compounds, amide compounds, nitrile compounds, epoxy compounds and oxime compounds (the above catalyst is referred to hereinafter as the fifth invention).

According to this invention, there is sixthly provided a process for hydrogenating an olefinically unsaturated compound, which process comprises contacting an olefinically unsaturated monomer with hydrogen in the presence of the hydrogenation catalyst of the first, second, third, fourth or fifth invention in an inert, organic solvent (the above process is referred to hereinafter as the sixth invention).

DETAILED DESCRIPTION OF THE INVENTION

Hydrogenation Catalyst

Constituent (A)

The constituent (A) in the first, second and fifth inventions is composed of at least one member selected from the group consisting of the compounds represented by the above general formula (1) [referred to hereinafter as the transition metal compound (1)] and the compounds represented by the above general formula (2) [referred to hereinafter as the transition metal compound (2)].

In the general formulas (1) and (2), the monovalent or divalent hydrocarbon groups $X^1$ to $X^4$ each having a cyclopentadiene skeleton and having 5 to 20 carbon atoms are bonded to the transition metal $M^1$ or $M^2$ in their cyclopentadiene skeleton portions, provided that the position in which $X^3$ and $X^4$ are bonded to $Z^1$ in the general formula (2) is not critical.

In the general formula (1), $M^1$ is titanium atom, zirconium atom or hafnium atom, and titanium atom is preferable.

Moreover, as the monovalent hydrocarbon groups having 5 to 20 carbon atoms and having a cyclopendadiene skeleton which are $X^1$ and $X^2$, there can be mentioned monovalent groups resulting from, for example, cyclopentadiene, n-butylcyclopentadiene, 2-ethylhexylcyclopentadiene, tetramethylcyclopentadiene, indene, 4,5-dihydroindene, 6,7-dihydroindene, 4,5,6,7-tetrahydroindene and the like, and among them, preferable are cyclopentadienyl group, tetramethylcyclopentadienyl group, 4,5,6,7-tetrahydro-1-indenyl group and 1-indenyl group.

Furthermore, the group having a heterocyclic skeleton in the definitions of $Y^1$ and $Y^2$ may be monocyclic or polycyclic. The polycyclic ring may be condensed or non-condensed. This heterocyclic skeleton is preferably of a 5-membered or 6-membered ring.

The hetero atom which is a constituent of the heterocyclic skeleton in the definitions of $Y^1$ and $Y^2$ is preferably oxygen atom or nitrogen atom, and at least one hetero atom or at least one kind of hetero atom can be present in the heterocyclic skeleton.

When the group having a heterocyclic skeleton in the definitions of $Y^1$ and $Y^2$ is bonded to $M^1$ through a nitrogen atom thereof, the nitrogen atom per se is preferably a constituent of the heterocyclic skeleton.

The transition metal compound (1) is basically one which can be synthesized via any one of the reactions represented by the reaction formulas (16-1) to (16-3) between a heterocyclic compound (α) and lithium hydride or an organo-lithium compound in the constituent (A') described hereinafter, and as the monovalent organic group having 3 to 20 carbon atoms and having a heterocyclic skeleton which group is bonded to $M^1$ through an oxygen atom or a nitrogen atom thereof in the definitions of $Y^1$ and $Y^2$ in the general formula (1), there can be mentioned organic groups resulting from the heterocyclic compounds (α); however, preferable are groups represented by the following formulas (6-1) to (6-10) and the like:

(6-1)

(6-2)

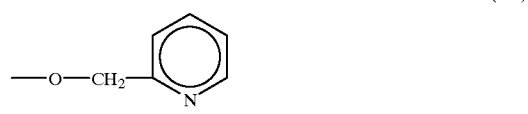
(6-3)

(6-4)

(6-5)

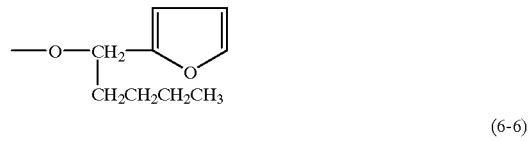
(6-6)

(6-7)

(6-8)

(6-9)

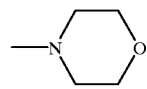

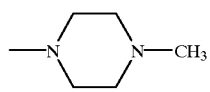 (6-10)

In addition, as examples of the halogen atoms in the definition of $Y^1$, there can be mentioned chlorine atom, bromine atom, iodine atom and the like, and chlorine atom is particularly preferable.

As preferable specific examples of the transition metal compound (1), there can be mentioned titanium compounds such as those represented by the following formulas (7-1) to (10-7) and the like and compounds formed by substituting zirconium atom or hafnium atom for the titanium atom in the above titanium compounds. In each of the following formulas (7-1) to (10-7), [CP] means a cyclopentadienyl group, [t-meCP] means a tetramethylcyclopenadienyl group, [t-hyID] means C4,5,6,7-tetrahydroindenyl group and [ID] means an indenyl group (the same applies hereinafter).

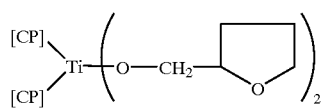 (7-1)

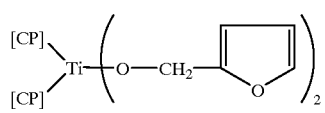 (7-2)

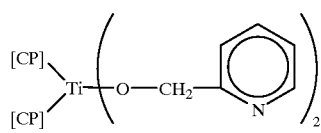 (7-3)

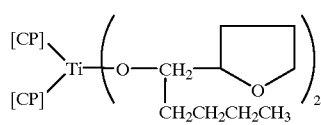 (7-4)

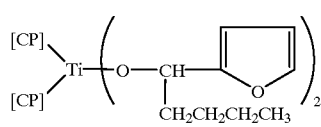 (7-5)

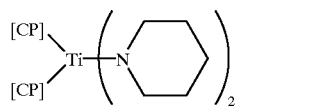 (7-6)

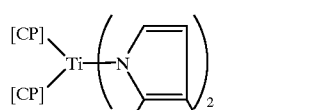 (7-7)

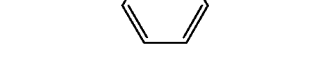

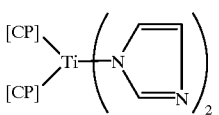 (7-8)

(7-9)

(7-10)

(7-11)

(7-12)

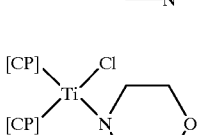 (7-13)

(7-14)

(7-15)

(7-16)

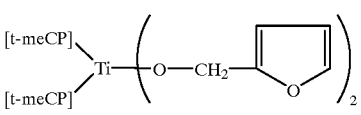 (8-1)

(8-2)

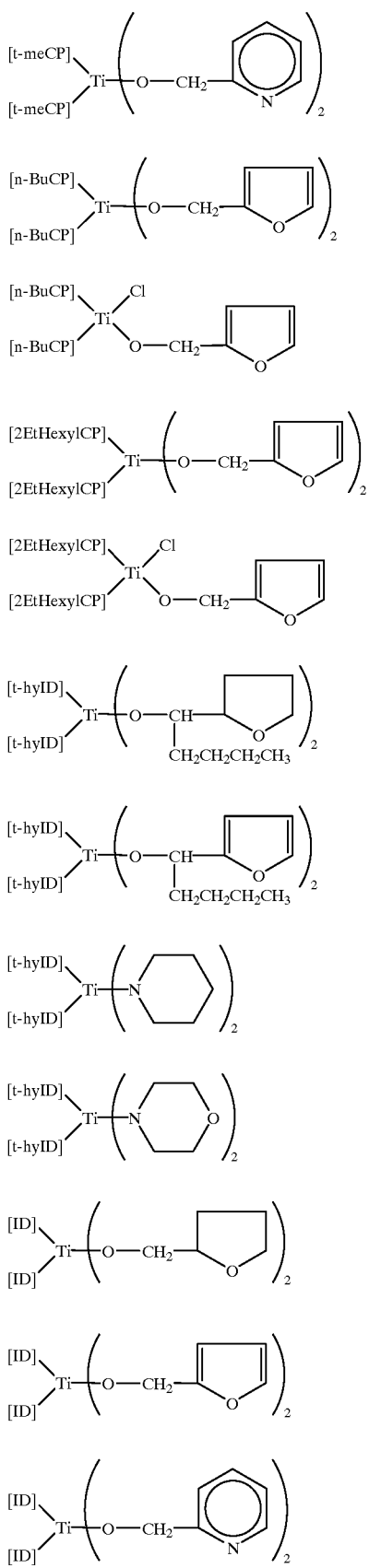
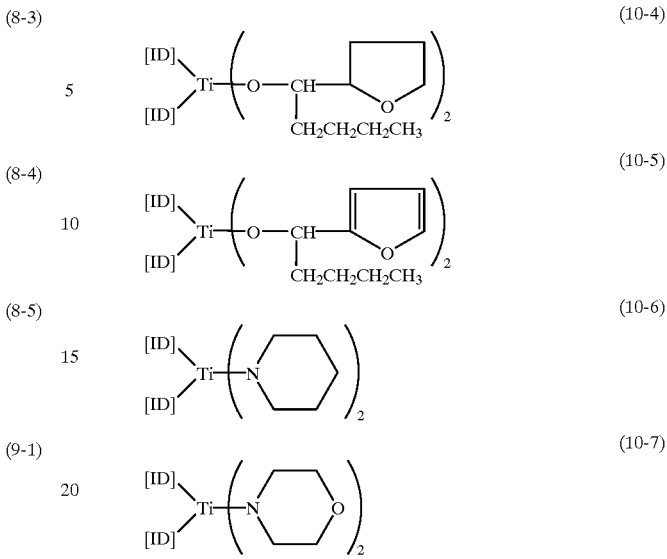

Among these transition metal compounds (1), particularly preferable are the formula (7-1), the formula (7-2), the formula (7-3), the formula (7-4), the formula (7-5), the formula (7-6), the formula (7-7), the formula (7-8), the formula (7-9), the formula (7-10), the formula (7-11), the formula (7-12), the formula (7-13), the formula (7-14), the formula (7-15), the formula (7-16) and the like.

In the general formula (2), $M^2$ is titanium atom, zirconium atom or hafnium atom; however, titanium atom is preferable.

Moreover, as the divalent hydrocarbon groups having 5 to 20 carbon atoms and having a cyclopentadiene skeleton which groups are $X^3$ and $X^4$, there can be mentioned, for example, divalent groups resulting from cyclopentadiene, tetramethylcyclopentadiene, indene, 4,5-dihydroindene, 6,7-dihydroindene, 4,5,6,7-tetrahydroindene and the like; etc, and among them, $\eta^5$-2,4-cyclopentadien-1-ylidene group, 4,5,6,7-tetrahydroinden-1-ylidene group and inden-1-ylidene group are preferable.

Moreover, as the divalent hydrocarbon group having 1 to 3 carbon atoms, the (poly)silylene group having 1 to 3 silicon atoms or the (poly)siloxanylene group having 1 to 3 silicon atoms which is $Z^1$, there can be mentioned, for example, methylene group, ethylene group, 1,2-propylene group, 1,3-propylene group, —CH=CH—, —CH=C(CH$_3$)—, —C≡—C—, silylene group, dimethysilylene group, tetramethyldisilylene group, hexamethyltrisilylene group, —SiH$_2$O—, —Si(CH$_3$)$_2$O—, —Si(CH$_3$)$_2$OSi(CH$_3$)$_2$O—, —Si(CH$_3$)$_2$OSi(CH$_3$)$_2$OSi(CH$_3$)$_2$O— and the like. Among them, ethylene group and dimethylsilylene group are preferable.

Furthermore, the group having a heterocyclic skeleton in the definitions of $Y^3$ and $Y^4$ may be monocyclic or polycyclic, and the polycyclic ring may be condensed or non-condensed. This heterocyclic skeleton is preferable of 5-membered or 6-membered ring.

As the hetero atom which is a constituent of the heterocyclic skeleton in the definitions of $Y^3$ and $Y^4$, oxygen atom and nitrogen atom are preferable, and at least one of these hetero atoms or at least one kind of these hetero atoms can be present in the heterocyclic skeleton in the definitions of $Y^3$ and $Y^4$.

When the group having a heterocyclic skeleton is bonded to $M^2$ through a nitrogen atom thereof in the definitions of $Y^3$ and $Y^4$, the nitrogen atom per se is preferably a constituent of the heterocyclic skeleton.

The transition metal compound (2) is basically one which can be synthesized via one of the reactions represented by the reaction formulas (16-1) to (16-3) between the heterocyclic compound (α) and lithium hydride or an organolithium compound in the constituent (A') described hereinafter, and as the monovalent organic group having 3 to 20 carbon atoms and having a heterocyclic skeleton which group is bonded to $M^2$ through a nitrogen atom thereof in the definitions of $Y^3$ and $Y^4$ in the general formula (2), there can be mentioned organic groups resulting from the above heterocyclic compounds (α), and the groups represented by the above formulas (6-1) to (6-10) and the like are particularly preferable.

In addition, as examples of the halogen atom in the definition of $Y^3$, there can be mentioned chlorine atom, bromine atom, iodine atom and the like, and chlorine atom is particularly preferable.

As preferable examples of the transition metal compound (2), there can be mentioned titanium compounds represented by the following formulas (11-1) to (15-3) and the like and compounds formed by substituting zirconium atom or hafnium atom for the titanium atom of the above titanium compounds. In the following formulas, [η-CP-YD] means η$^5$-2,4-cyclopentadien-1-ylidene group, [t-hy-1-ID] means C4,5,6,7-tetrahydro-1-indenyl group, [1-ID] means 1-indenyl group, [t-hy-1-ID] means C4,5,6,7-tetrahydro-1-indenyl group and [1-ID] means 1-indenyl group (the same applies hereinafter.

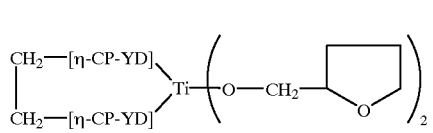
(11-1)

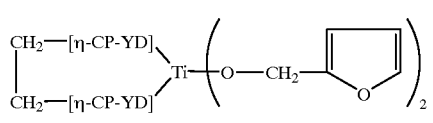
(11-2)

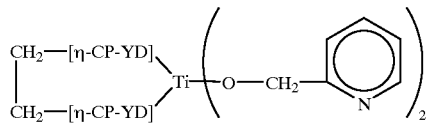
(11-3)

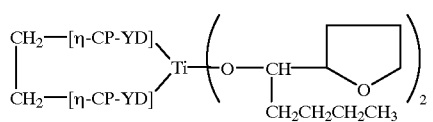
(11-4)

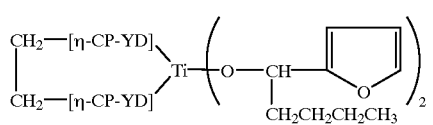
(11-5)

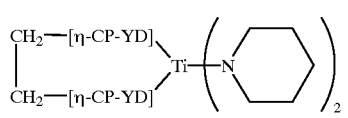
(11-6)

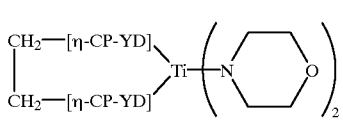
(11-7)

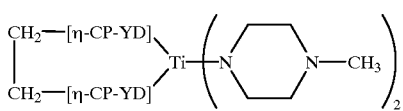
(11-8)

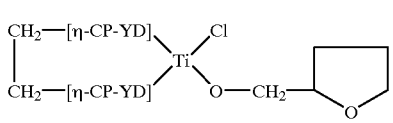
(11-9)

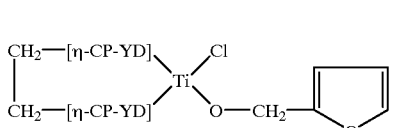
(11-10)

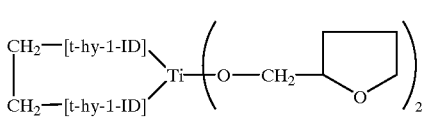
(12-1)

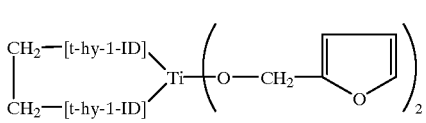
(12-2)

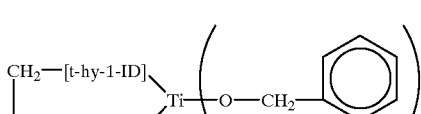
(12-3)

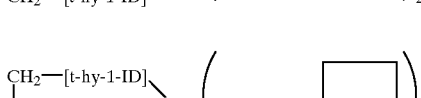
(12-4)

(12-5)

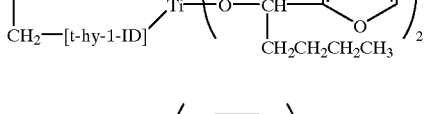
(13-1)

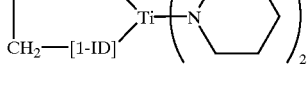
(13-2)

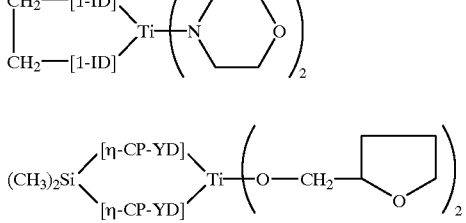
(14-1)

(14-2)
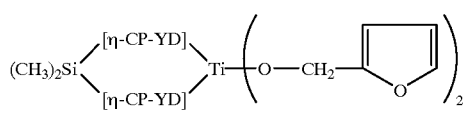

(14-3)
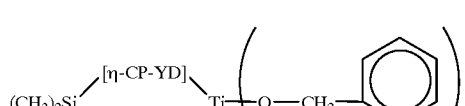

(14-4)
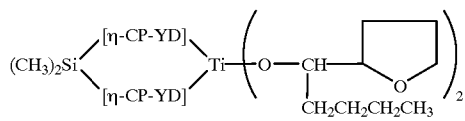

(14-5)
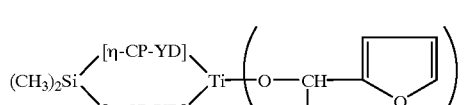

(14-6)
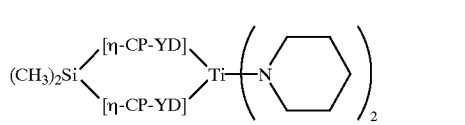

(14-7)
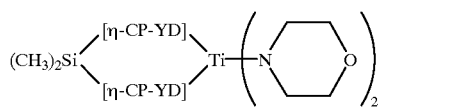

(14-8)
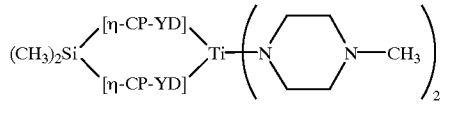

(14-9)
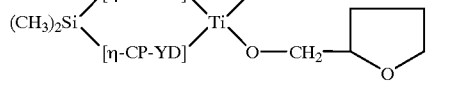

(14-10)
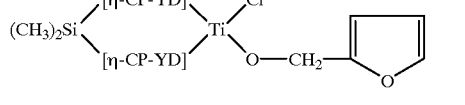

(15-1)
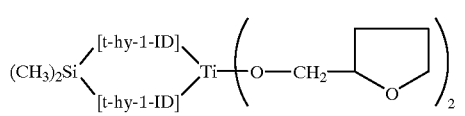

(15-2)
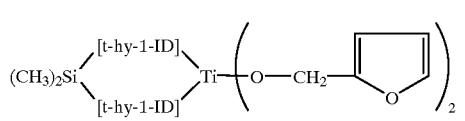

(15-3)
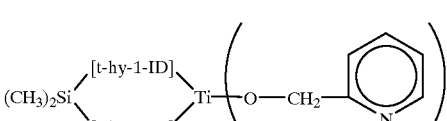

Among these transition metal compounds (2), particularly preferable are the formula (11-1), the formula (11-2), the formula (11-3), the formula (11-4), the formula (11-5), the formula (11-6), the formula (11-7), the formula (11-8), the formula (11-9), the formula (11-10), the formula (14-1), the formula (14-2), the formula (14-3), the formula (14-4), the formula (14-5), the formula (14-6), the formula (14-7), the formula (14-8), the formula (14-9), the formula (14-10) and the like.

The constituent (A') in the third, fourth and fifth inventions is the component obtained by reacting at least one compound represented by the above general formula (4) or the above general formula (5) with at least one compound represented by the above general formula (3) obtained by reacting a heterocyclic compound having a hydroxyl group, a carbonyl group or a secondary amino group [referred to hereinafter as the heterocyclic compound (α)] with lithium hydride or an organolithium compound. Here, the term "carbonyl group" means the group —C(=O)— in aldehyde group and ketone group, and includes those which take the form of a keto-enol tautomer.

The reaction of the heterocyclic compound (α) with lithium hydride or an organolithium compound can be basically represented by the following reaction formulas (16-1) to (16-3):

$$LiR+HO-R' \rightarrow LiO-R'+R-H \quad (16-1)$$

(16-2)

$$LiR-HN< \longrightarrow Li-N< + R-H \quad (16-3)$$

wherein R represents a hydrogen atom or a monovalent organic group, R' represents a monovalent organic group and R" represents a hydrogen atom or a monovalent organic group.

In the above reaction formulas, as the group R in LiR, a monovalent organic group is preferable.

The reaction of the above heterocyclic compound (α) with lithium hydride or an organolithium compound proceeds upon elimination of the lithium halide formed by combining the halogen atom in the former compound with the lithium atom in the latter compound.

These reactions can be carried out by contacting the corresponding starting materials with one another in an inert, organic solvent.

As the above-mentioned inert, organic solvent, there can be mentioned, for example, the same as mentioned as specific examples of the inert, organic solvent used in the process for hydrogenating an olefinically unsaturated compound described hereinafter.

As the heterocyclic compound (α) used in the production of the constituent (A'), there can be mentioned, for example, monohydroxy compounds of the following (α-1-1) to (α-1-10) and the like; monocarbonyl compounds of the following (α-2-1) to (α-2-8) and the like; and compounds having one secondary amino group of the following (α-3-1) to (α-3-6) and the like. The "ring-substituted derivative" referred to in these compounds means a substitution derivative formed by substitution on the heterocyclic or aromatic ring contained in each of the compounds (provided that the substitution derivatives formed by substitution for the secondary amine are excluded).

(α-1-1)

Tetrahydrofurfuryl alcohol and its ring-substituted derivatives such as 3-methyltetrahydrofurfuryl alcohol, 4-methyltetrahydrofurfuryl alcohol, 5-methyltetrahydrofurfuryl alcohol, 3,4-dimethyltetrahydrofurfuryl alcohol, 3,5-dimethyltetrahydrofurfuryl alcohol, 4,5-dimethyltetrahydrofurfuryl alcohol and the like.

(α-1-2)

Furfuryl alcohol and its ring-substituted derivatives such as 3-methylfurfuryl alcohol, 4-methylfurfuryl alcohol, 5-methylfurfuryl alcohol, 3,4-dimethylfurfuryl alcohol, 3,5-dimethylfurfuryl alcohol, 4,5-dimethylfurfuryl alcohol and the like.

(α-1-3)

1-Substituted pyrrolidinols and their ring-substituted derivatives such as 1-methyl-2-pyrrolidinol, 1,3-dimethyl-2-pyrrolidinol, 1,4-dimethyl-2-pyrrolidinol, 1,5-dimethyl-2-pyrrolidinol, 1-ethyl-2-pyrrolidinol, 1-methyl-3-pyrrolidinol, 1,2-dimethyl-3-pyrrolidinol, 1,4-dimethyl-3-pyrrolidinol, 1,5-dimethyl-3-pyrrolidinol, 1-ethyl-3-pyrrolidinol, 1-n-propyl-3-pyrrolidinol, 1-i-propyl-3-pyrrolidinol, 1-n-butyl-3-pyrrolidinol, 1-i-butyl-3-pyrrolidinol, 1-sec-butyl-3-pyrrolidinol, 1-t-butyl-3-pyrrolidinol, 1-cyclopentyl-3-pyrrolidinol, 1-cyclohexyl-3-pyrrolidinol, 1-benzyl-3-pyrrolidinol, 1-phenyl-3-pyrrolidinol, 1-methyloxycarbonyl-3-pyrrolidinol, 1-ethyloxycarbonyl-3-pyrrolidinol, 1-benzyloxycarbonyl-3-pyrrolidinol, 1-(4'-pyridyl)-3-pyrrolidinol and the like.

(α-1-4)

1-Substituted pyrrolidinealkanols and their ring-substituted derivatives such as 1-methyl-2-pyrrolidinemethanol, 1,3-dimethyl-3-pyrrolidinemethanol, 1,4-dimethyl-2-pyrrolidinemethanol, 1,5-dimethyl-2-pyrrolidinemethanol, 1-ethyl-2-pyrrolidineimethanol, 1-methyl-3-pyrrolidinemethanol, 1,2-dimethyl-3-pyrrolidinemethanol, 1,4-dimethyl-3-pyrrolidinemethanol, 1,5-dimethyl-3-pyrrolidinemethanol, 1-ethyl-3-pyrrolidinemethanol, 1-methyl-2-pyrrolidineethanol, 1-ethyl-2-pyrrolidineethanol, 1-methyl-3-pyrrolidineethanol, 1-ethyl-3-pyrrolidineethanol and the like.

(α-1-5)

1-Substituted hydroxypyrroles and their ring-substituted derivatives such as 1-methyl-2-hydroxypyrrole, 1,3-dimethyl-2-hydroxypyrrole, 1,4-dimethyl-2-hydroxypyrrole, 1,5-dimethyl-2-hydroxypyrrole, 1-ethyl-2-hydroxypyrrole, 1-methyl-3-hydroxypyrrole, 1,2-dimethyl-3-hydroxypyrrole, 1,4-dimethyl-3-hydoroxypyrrole, 1,5-dimethyl- 3-hydroxypyrrole, 1-ethyl-3-hydroxypyrrole and the like.

(α-1-6)

1-Substituted pyrrolealkanols and their ring-substituted derivatives such as 1-methyl-2-pyrrolemethanol, 1,3-dimethyl-2-pyrrolemethanol, 1,4-dimethyl-2-pyrrolemethanol, 1,5-dimethyl-2-pyrrolemethnaol, 1-ethyl-2-pyrrolemethanol, 1-methyl-3-pyrrolemethanol, 1,2-dimethyl-3-pyrrolemethanol, 1,4-dimethyl-3-pyrrolemethanol, 1,5-dimethyl-3-pyrrolemethanol, 1-ethyl-3-pyrrolemethanol, 1-methyl-2-pyrroleethanol, 1-ethyl-2-pyrroleethanol, 1-methyl-3-pyrroleethanol, 1-ethyl-3-pyrroleethanol and the like.

(α-1-7)

1-Substituted piperidinols and their ring-substituted derivatives such as 1-methyl-2-piperidinol, 1,3-dimethyl-2-piperidinol, 1,4-dimethyl-2-piperidinol, 1,5-dimethyl-2-piperidinol, 1,6-dimethyl-2-piperidinol, 1-ethyl-2-piperidinol, 1-methyl-3-piperidinol, 1,2-dimethyl-3-piperidinol, 1,4-dimethyl-3-piperidinol, 1,5-dimethyl-3-piperidinol, 1,6-dimethyl-3-piperidinol, 1-ethyl-3-piperidinol, 1-n-propyl-3-piperidinol, 1-i-propyl-3-piperidinol, 1-n-butyl-3-piperidinol, 1-i-butyl-3-piperidinol, 1-sec-butyl-3-piperidinol, 1-1t-butyl-3-piperidinol, 1-cyclopentyl-3-piperidinol, 1-cyclohexyl-3-piperidinol, 1-benzyl-3-piperidinol, 1-phenyl-3-piperidinol, 1-methyl-4-piperidinol, 1,2-dimethyl-4-piperidinol, 1,3-dimethyl-4-piperidinol, 1-ethyl-4-piperidinol, 1-n-propyl-4-piperidinol, 1-i-propyl-4-piperidinol, 1-n-butyl-4-piperidinol, 1-i-butyl-4-piperidinol, 1-sec-butyl-4-piperidinol, 1-t-butyl-4-piperidinol, 1-cyclopentyl-4-piperidinol, 1-cyclohexyl-4-piperidinol, 1-benzyl-4-piperidinol, 1-phenyl-4-piperidinol, 1-methyloxycarbonyl-4-piperidinol, 1-ethyloxycarbonyl-4-piperidinol, 1-benzyloxycarbonyl-4-piperidinol, 1-(4'-pyridyl)-4-piperidinol and the like.

(α-1-8)

1-Substituted piperidinealkanols and their ring-substituted derivatives such as 1-methyl-2-piperidinemethanol, 1,3-dimethyl-2-piperidinemethanol, 1,4-dimethyl-2-piperidinemethanol, 1,5-dimethyl-2-piperidinemethanol, 1,6-dimethyl-2-piperidinemethanol, 1-ethyl-2-piperidinemethanol, 1-methyl-3-piperidinemethanol, 1,2-dimethyl-3-piperidinemethanol, 1,4-dimethyl-3-piperidinemethanol, 1,5-dimethyl-3-piperidinemethanol, 1,6-dimethyl-3-piperidinemethanol, 1-ethyl-3-piperidinemethanol, 1-methyl-4-piperidinemethanol, 1,2-dimethyl-4-piperidinemethanol, 1,3-dimethyl-4-piperidinemethanol, 1,5-dimethyl-4-piperidinemethanol, 1,6-dimethyl-4-piperidinemethanol, 1-ethyl-4-piperidinemethanol, 1-methyl-2-piperidineethanol, 1-ethyl-2-piperidineethanol, 1-methyl-3-piperidineethanol, 1-ethyl-3-piperidineethanol, 1-methyl-4-piperidineethanol, 1-ethyl-4-piperidineethanol and the like.

(α-1-9)

Hydroxypyridines and their ring-substituted derivatives such as 2-hydroxypyridine, 2-hydroxy-3-methylpyridine, 2-hydroxy-4-methylpyridine, 2-hydroxy-5-methylpyridine, 2-hydroxy-6-methylpyridine, 2-hydroxy-3,4-dimethylpyridine, 2-hydroxy-3,5-dimethylpyridine, 2-hydroxy-3,6-dimethylpyridine, 2-hydroxy-4,5-dimethylpyridine, 2-hydroxy-4,6-dimethylpyridine, 2-hydroxy-5,6-dimethylpyridine, 3-hydroxypyridine, 3-hydroxy-2-methylpyridine, 3-hydroxy-4-methylpyridine, 3-hydroxy-5-methylpyridine, 3-hydroxy-6-methylpyridine, 3-hydroxy-2,4-dimethylpyridine, 3-hydroxy-2,5-dimethylpyridine, 3-hydroxy-2,6-dimethylpyridine, 3-hydroxy-4,5-dimethylpyridine, 3-hydroxy-4,6-dimethylpyridine, 3-hydroxy-5,6-dimethylpyridine, 4-hydroxypyridine, 4-hydroxy-2-methylpyridine, 4-hydroxy-3-methylpyridine, 4-hydroxy-2,3-dimethylpyridine, 4-hydroxy-2,5-dimethylpyridine, 4-hydroxy-2,6-dimethylpyridine, 4-hydroxy-3,5-dimethylpyridine, 4-hydroxy-3,6-dimethylpyridine and the like.

(α-1-10)

Pyridinealkanols and their ring-substituted derivatives such as 2-pyridinemethanol, 3-methyl-2-pyridinemethanol, 4-methyl-2-pyridinemethanol, 5-methyl-2-pyridinemethanol, 6-methyl-2-pyridinemethanol, 3-pyridinemethanol, 2-methyl-3-pyridinemethanol, 4-methyl-3-pyridinemethanol, 5-methyl-3-pyridinemethanol, 6-methyl-3-pyridinemethanol, 4-pyridinemethanol, 2-methyl-4-pyridinemethanol, 3-methyl-4-pyridinemethanol, 2-pyridineethanol, 3-methyl-2-pyridineethanol, 4-methyl-2-pyridineethanol, 5-methyl-2-pyridineethanol, 6-methyl-2-pyridineethanol, 3-pyridineethanol, 2-methyl-3-pyridineethanol, 4-methyl-3-pyridineethanol, 5-methyl-3-pyridineethanol, 6-methyl-3-pyridineethanol, 4-pyridineethanol, 2-methyl-4-pyridineethanol, 3-methyl-4-pyridineethanol and the like.

(α-2-1)

Carbonyl group-containing tetrahydrofurans and their ring-substituted derivatives such as 2-formyltetrahydrofuran, 3-methyl-2-formyltetrahydrofuran, 4-methyl-2-formyltetrahydrofuran, 5-methyl-2-formyltetrahydrofuran, 3,4-dimethyl-2-formyltetrahydrofuran, 3,5-dimethyl-2-formyltetrahydrofuran, 4,5-dimethyl-2-formyltetrahydrofuran, 3-formyltetrahydrofuran, 2-methyl-3-formyltetrahydrofuran, 4-methyl-3-formyltetrahydrofuran, 5-methyl-3-formyltetrahydrofuran, 2,4-dimethyl-3-formyltetrahydrofuran, 2,5-dimethyl-3-formyltetrahydrofuran, 4,5-dimethyl-3-formyltetrahydrofuran, 2-acetyltetrahydrofuran, 3-methyl-2-acetyltetrahydrofuran, 4-methyl-2-acetyltetrahydrofuran, 5-methyl-2-acetyltetrahydrofuran, 2-propionyltetrahydrofuran, 2-butyryltetrahydrofuran, 3-acetyltetrahydrofuran, 2-methyl-3-acetyltetrahydrofuran, 4-methyl-3-acetyltetrahydrofuran, 5-methyl-3-acetyltetrahydrofuran, 3-propionyltetrahydrofuran, 3-butyryltetrahydrofuran and the like.

(α-2-2)

Carbonyl group-containing furans and their ring-substituted derivatives such as furfural, 3-methylfurfural, 4-methylfurfural, 5-methylfurfural, 3,4-dimethylfurfural, 3,5-dimethylfurfural, 4,5-dimethylfurfural, 3-formylfuran, 2-methyl-3-formylfuran, 4-methyl-3-formylfuran, 5-methyl-3-formylfuran, 2,4-dimethyl-3-formylfuran, 2,5-dimethyl-3-formylfuran, 4,5-dimethyl-3-formylfuran, 2-acetylfuran, 3-methyl-2-acetylfuran, 4-methyl-2-acetylfuran, 5-methyl-2-acetylfuran, 2-propionylfuran, 2-butyrylfuran, 3-acetylfuran, 2-methyl-3-acetylfuran, 4-methyl-3-acetylfuran, 5-methyl-3-acetylfuran, 3-propionylfuran, 3-butyrylfuran and the like.

(α-2-3)

Pyrrolidines having carbonyl group in the 1-position and their ring-substituted derivatives such as 1-formylpyrrolidine, 1-formyl-2-methylpyrrolidine, 1-formyl-3-methylpyrrolidine, 1-formyl-2,3-dimethylpyrrolidine, 1-formyl-2,4-dimethylpyrrolidine, 1-formyl-2,5-dimethylpyrrolidine, 1-formyl-3,4-dimethylpyrrolidine, 1-formyl-3,5-dimethylpyrrolidine, 1-acetylpyrrolidine, 1-acetyl-2-methylpyrrolidine, 1-acetyl-3-methylpyrrolidine, 1-acetyl-2,3-dimethylpyrrolidine, 1-acetyl-2,4-dimethylpyrrolidine, 1-acetyl-2,5-dimethylpyrrolidine, 1-acetyl-3,4-dimethylpyrrolidine, 1-acetyl-3,5-dimethylpyrrolidine, 1-propionylpyrrolidine, 1-butyrylpyrrolidine and the like.

(α-2-4)

Pyrroles having carbonyl group in the 1-position and their ring-substituted derivatives such as 1-formylpyrrole, 1-formyl-2-methylpyrrole, 1-formyl-3-methylpyrrole, 1-formyl-2,3-dimethylpyrrole, 1-formyl-2,4-dimethylpyrrole, 1-formyl-2,5-dimethylpyrrole, 1-formyl-3,4-dimethylpyrrole, 1-formyl-3,5-dimethylpyrrole, 1-acetylpyrrole, 1-acetyl-2-methylpyrrole, 1-acetyl-3-methylpyrrole, 1-acetyl-2,3-dimethylpyrrole, 1-acetyl-2,4-dimethylpyrrole, 1-acetyl-2,5-dimethylpyrrole, 1-acetyl-3,4-dimethylpyrrole, 1-acetyl-3,5-dimethylpyrrole, 1-propionylpyrrole, 1-butyrylpyrrole and the like.

(α-2-5)

Piperidines having carbonyl group in the 1-position and their ring-substituted derivatives such as 1-formylpiperidine, 1-formyl-2-methylpiperidine, 1-formyl-3-methylpiperidine, 1-formyl-4-methylpiperidine, 1-formyl-2,3-dimethylpiperidine, 1-formyl-2,4-dimethylpiperidine, 1-formyl-2,5-dimethylpiperidine, 1-formyl-2,6-dimethylpiperidine, 1-formyl-3,4-dimethylpiperidine, 1-formyl-3,5-dimethylpiperidine, 1-formyl-3,6-dimethylpiperidine, 1-acetylpiperidine, 1-acetyl-2-methylpiperidine, 1-acetyl-3-methylpiperidine, 1-acetyl-4-methylpiperidine, 1-acetyl-2,3-dimethylpiperidine, 1-acetyl-2,4-dimethylpiperidine, 1-acetyl-2,5-dimethylpiperidine, 1-acetyl-2,6-dimethylpiperidine, 1-acetyl-3,4-dimethylpiperidine, 1-acetyl-3,5-dimethylpiperidine, 1-acetyl-3,6-dimethylpiperidine, 1-propionylpiperidine, 1-butyrylpiperidine and the like.

(α-2-6)

Carbonyl group-containing pyridines and their ring-substituted derivatives such as 2-formylpyridine, 2-formyl-3-methylpyridine, 2-formyl-4-methylpyridine, 2-formyl-5-methylpyridine, 2-formyl-6-methylpyridine, 2-formyl-3,4-dimethylpyridine, 2-formyl-3,5-dimethylpyridine, 2-formyl-3,6-dimethylpyridine, 2-formyl-4,5-dimethylpyridine, 2-formyl-4,6-dimethylpyridine, 2-formyl-5,6-dimethylpyridine, 3-formylpyridine, 3-formyl-2-methylpyridine, 3-formyl-4-methylpyridine, 3-formyl-5-methylpyridine, 3-formyl-6-methylpyridine, 3-formyl-2,4-dimethylpyridine, 3-formyl-2,5-dimethylpyridine, 3-formyl-2,6-dimethylpyridine, 3-formyl-4,5-dimethylpyridine, 3-formyl-4,6-dimethylpyridine, 3-formyl-5,6-dimethylpyridine, 4-formylpyridine, 4-formyl-2-methylpyridine, 4-formyl-3-methylpyridine, 4-formyl-2,3-dimethylpyridine, 4-formyl-2,5-dimethylpyridine, 4-formyl-2,6-dimethylpyridine, 4-formyl-3,5-dimethylpyridine, 4-formyl-3,6-dimethylpyridine, 2-acetylpyridine, 2-acetyl-3-methylpyridine, 2-acetyl-4-methylpyridine, 2-acetyl-5-methylpyridine, 2-acetyl-6-methylpyridine, 2-acetyl-3,4-dimethylpyridine, 2-acetyl-3,5-dimethylpyridine, 2-acetyl-3,6-dimethylpyridine, 2-acetyl-4,5-dimethylpyridine, 2-acetyl-4,6-dimethylpyridine, 2-acetyl-5,6-dimethylpyridine, 3-acetylpyridine, 3-acetyl-2-methylpyridine, 3-acetyl-4-methylpyridine, 3-acetyl-5-methylpyridine, 3-acetyl-6-methylpyridine, 3-acetyl-2,4-dimethylpyridine, 3-acetyl-2,5-dimethylpyridine, 3-acetyl-2,6-dimethylpyridine, 3-acetyl-4,5-dimethylpyridine, 3-acetyl-4,6-dimethylpyridine, 3-acetyl-5,6-dimethylpyridine, 4-acetylpyridine, 4-acetyl-2-methylpyridine, 4-acetyl-3-methylpyridine, 4-acetyl-2,3-dimethylpyridine, 4-acetyl-2,5-dimethylpyridine, 4-acetyl-2,6-dimethylpyridine, 4-acetyl-3,5-dimethylpyridine, 4-acetyl-3,6-dimethylpyridine, 4-propionylpyridine, 4-butyrylpyridine and the like.

(α-2-7)

1-Substituted piperidones and their ring-substituted derivatives such as 1-methyl-3-piperidone, 1,2-dimethyl-3-piperidone, 1,4-dimethyl-3-piperidone, 1,5-dimethyl-3- piperidone, 1,6-dimethyl-3-piperidone, 1-ethyl-3-piperidone, 1-methyl-4-piperidone, 1,2-dimethyl-4-piperidone, 1,3-dimethyl-4-piperidone, 1-ethyl-4-piperidone, 1-n-propyl-4-piperidone, 1-i-propyl-4-piperidone, 1-n-butyl-4-piperidone, 1-i-butyl-4-piperidone, 1-sec-butyl-4-piperidone, 1-t-butyl-4-piperidone, 1-cyclopentyl-4-piperidone, 1-cyclohexyl-4-piperidone, 1-benzyl-4-piperidone, 1-phenyl-4-piperidone, 1-methyloxycarbonyl-4-piperidone, 1-ethyloxycarbonyl-4-piperidone, 1-benzyloxycarbonyl-4-piperidone, 1-(4'-pyridyl)-4-piperidone and the like.

(α-2-8)

1-n-Dodecylazacycloheptan-2-one.

(α-3-1)

Pyrrolidine and its ring-substituted derivatives such as 2-methylpyrrolidine, 3-methylpyrrolidine, 2,3-dimethylpyrrolidine, 2,4-dimethylpyrrolidine, 2,5-dimethylpyrrolidine, 3,4-dimethylpyrrolidine, 3,5-dimethylpyrrolidine, methyl 3-pyrrolidinecarboxylate, ethyl 3-pyrrolidinecarboxylate and the like.

(α-3-2)

Pyrrole and its ring-substituted derivatives such as 2-methylpyrrole, 3-methylpyrrole, 2,3-dimethylpyrrole, 2,4-dimethylpyrrole, 2,5-dimethylpyrrole, 3,4-dimethylpyrrole, 3,5-dimethylpyrrole, methyl 3-pyrrolecarboxylate, ethyl 3-pyrrolecarboxylate and the like.

(α-3-3)

Piperidine and its ring-substituted derivatives such as 2-methylpiperidine, 3-methylpiperidine, 4-methylpiperidine, 2,3-dimethylpiperidine, 2,4-dimethylpiperidine, 2,5-dimethylpiperidine, 2,6-dimethylpiperidine, 3,4-dimethylpiperidine, 3,5-dimethylpiperidine, 3,6-dimethylpiperidine, 4-ethylpiperidine, 4-benzylpiperidine, methyl 4-piperidinecarboxylate, ethyl 4-piperidinecarboxylate, 4-piperidinopiperidine and the like.

(α-3-4)

1-Substituted piperazines; and their ring-substituted derivatives such as 1-methylpiperazine, 1-ethylpiperazine, 1-n-propylpiperazine, 1-i-propylpiperazine, 1-allylpiperazine, 1-n-butylpiperazine, 1-i-butylpiperazine, 1-sec-butylpiperazine, 1-t-butylpiperazine, 1-cyclopentylpiperazine, 1-cyclohexylpiperazine, 1-benzylpiperazine, 1-phenylpiperazine, 1-(3'-aminopropyl)piperazine, 1-methyloxycarbonylpiperazine, 1-ethyloxycarbonylpiperazine, 1-(2'-pyridyl)piperazine, 1-(3'-pyridyl)piperazine, 1-(4'-pyridyl)piperazine, 1-(2'-pyrimidyl)piperazine, 1-(4'-pyrimidyl)piperazine, 1-(5'-pyrimidyl)piperazine, 1-(6'-pyrimidyl)piperazine and the like.

(α-3-5)

1-Substituted homopiperazines such as 1-methylhomopiperazine, 1-ethylhomopiperazine and the like.

(α-3-6)

2-Pyrroline, 3-pyrroline, pyrazole, imidazole, 1H-1,2,3-triazole, 2H-1,2,3-triazole, 1H-1,2,4-triazole, 4H-1,2,4-triazole, 4H-1,4-dioxazine, morpholine, indole, isoindole, indoline, isoindoline, carbazole and phenoxazine.

Among these heterocyclic compounds (α), particularly preferable are monohydroxy compounds such as tetrahydrofurfuryl alcohol, furfuryl alcohol, 2-pyridinemethanol and the like; monocarbonyl compounds such as furfural and the like; compounds having one secondary amino group such as indole, piperidine, imidazole, morpholine, 1-methylpiperazine and the like; etc.

Constituent (B)

The constituent (B) in the second, fourth and fifth inventions is at least one member selected from the group consisting of organic compounds, halides and hydrides of metals of Groups I to III of the Periodic Table.

As the organic compounds of metals of Groups I to III of the Periodic Table, preferable are organic compounds of lithium, sodium, magnesium, zinc and aluminum.

As the organic compound of lithium, there can be mentioned, for example, reaction products of divinylbenzene with methyllithium, ethyllithium, n-propyllithium, i-propyllithium, n-butyllithium, i-butyllithium, sec-butyllithium, t-butyllithium or n-butyllithium; lithium-terminated living polymers; carboxylithium-terminated, polymers obtained by reaction of carbon dioxide with lithium-terminated living polymers; and the like.

As the organic compounds of sodium, there can be mentioned, for example, methylsodium, ethylsodium, n-propylsodium, i-propylsodium, n-butylsodium, i-butylsodium, sec-butylsodium, t-butylsodium and the like.

As the organic compounds of magnesium, there can be mentioned, for example, dimethylmagnesium, diethylmagnesium, di-n-propylmagnesium, di-n-butylmagnesium, di-n-pentylmagnesium and the like.

As the organic compounds of zinc, there can be mentioned, for example, diethylzinc, diphenylzinc, bis-(cyclopentadienyl)zinc and the like.

As the organic compounds of aluminum, there can be mentioned, for example, trimethylaluminum, triethylaluminum, tri-i-butylaluminum, tri(2-ethylhexyl)aluminum, triphenylaluminum, dimethylaluminum chloride, diethylaluminum chloride, methylaluminum dicliloride, ethylaluminum dichloride, methylaluminum sesquichloride, ethylaluminum sesquichloride, dimethylaluminum hydride, diethylaluminum hydride, di-i-butylaluminum hydride, aluminum tri-i-propoxide, aluminum tri-t-butoxide, diethylaluminum ethoxide, methylaluminoxane and ethylaluminoxane; and in addition, complexes obtained by previously reacting these organic compounds of aluminum with the above-mentioned organic compounds of lithium or organic compounds of sodium; complexes obtained by previously reacting these organic compounds of aluminum with the above-mentioned organic compounds of magnesium (ate complexes); and the like.

As specific examples of the halides of metals of Groups I to III of the Periodic Table, there can be mentioned lithium chloride, magnesium dichloride, aluminum trichloride and the like.

As specific examples of the hydrides of metals of Groups I to III of the Periodic Table, there can be mentioned lithium hydride obtained by reacting hydrogen with a lithium-terminated living polymer; a hydride containing at least two metals such as lithium aluminum tetrahydride; and the like.

Among the constituents (B), when ease of handling and the like are taken into consideration, preferable are n-butyllithium, sec-butyllithium, dimethylmagnesium, diethylmagnesium, methylmagnesium chloride, ethylmagnesium chloride, methylmagnesium bromide, triethylaluminum, tri-i-butylaluminum, diethylaluminum chloride, ethylaluminum dichloride, aluminum tri-i-propoxide, aluminum tri-t-butoxide, lithium chloride, lithium hydride, a lithium-terminated living polymer, a carboxylithium-terminated polymer obtained by a lithium-terminated living polymer with carbon dioxide, and the like.

The ratio between the constituent (A) and the constituent (B) used in the second invention, the ratio between the constituent (A') and the constituent (B) used in the fourth invention and the ratio between the constituent (A) and/or the constituent (A') and the constituent (B) used in the fifth invention are usually about not more than 20 in terms of the mole ratio between the metal in the constituent (B) and the transition metal in the constituent (A) and/or the constituent (A') (referred to hereinafter as the (B)/transition metal mole ratio), whereby a high catalytic activity and a high hydrogenation selectivity are exerted. The constituent (B)/transition metal mole ratio is preferably in the range of 0.1 to 20, more preferably 0.5 to 15, and particularly preferably 2 to 10. By adjusting the ratio in such a range, the catalytic activity is remarkably increased. In this case, when the constituent (B)/transition metal mole ratio exceeds 20, it follows that the expensive constituent (B) is used in excess without substantially participating in the enhancement of the catalytic activity. This is not economical and, in addition, there is a fear of causing undesirable side reactions. Therefore, the mole ratio exceeding 20 is not desirable.

Constituent (C)

The hydrogenation catalyst in the fifth invention comprises, in addition to the above-mentioned constituent (A) and/or the constituent (Al) and the above-mentioned constituent (B), (C) at least one member selected from the group consisting of alcohol compounds, carboxylic acid compounds, chain ester compounds, lactone compounds, ether compounds, thioether compounds, ketone compounds, aldehyde compounds, sulfoxide compounds, amine compounds, amide compounds, nitrile compounds, epoxy compounds and oxime compounds, whereby the storage stability of the catalyst is remarkably enhanced and simultaneously the particularly excellent maintainability of reaction activity is exerted and the handleability becomes extremely excellent.

Among the above-mentioned constituents (C), preferable are monohydric alcohols, carboxylic acid compounds, ether compounds, ketone compounds and tertiary amines in the aspect of hydrogenation activity.

The proportion of the constituent (C) used in the fifth invention is preferably in the range of 0.01 to 20, more preferably 0.05 to 15 and most preferably 0.1 to 10, as the mole ratio between the constituent (C) and the constituent (B). When the proportion falls within the above range, the catalytic activity becomes very high and the storage stability and the maintainability of catalytic activity are remarkably enhanced.

As the combination of the constituent (A) with the constituent (B) in the second invention, particularly preferable is a system in which the constituent (A) consists of at least one member selected from the group consisting of the transition metal compounds (1) and the constituent (B) consists of at least one organic compound of lithium.

As the combination of the constituent (A') with the constituent (B) in the fourth invention, particularly preferable is a system in which the constituent (A') consists of at least one member selected from the group consisting of components obtained by reaction of the compounds represented by the above-mentioned general formula (3) with the compounds represented by the above-mentioned general formula (4) and the constituent (B) consists of at least one organic compound of lithium.

As the combination of the constituent (A) and/- or the constituent (A') with the constituent (B) and the constituent (C), particularly preferable is a system in which the constituent (A) consists of at least one member selected from the group consisting of the transition metal compounds (1), the constituent (A') consists of at least one member selected from the group consisting of components obtained by reaction of the compound represented by the above-mentioned general formula (3) with the compound represented by the above-mentioned general formula (4), the constituent (B) consists of at least one member selected from the group consisting of the organic compounds of lithium and lithium hydride, and the constituent (C) consists of at least one member selected from the group consisting of monohydric alcohols, carboxylic acid compounds, ether compounds, ketone compounds and tertiary amines.

The hydrogenation catalysts in the first invention, the second invention, the third invention and the fourth invention have such characteristics that the catalytic activity and hydrogenation selectivity are very high, the thermal resistance is excellent, the reaction velocity is hardly lowered even at relatively low temperatures and hence the hydrogenation of an olefinically unsaturated compound can be effected selectively and with a high efficiency in a broad temperature range under mild conditions and, at the same time, the storage stability and maintainability of catalytic activity are excellent, and the catalysts are hardly affected by the co-existing impurities.

Moreover, the hydrogenation catalyst of the fifth invention has, in addition to the above-mentioned characteristics of the hydrogenation catalysts of the first, second, third and fourth inventions, such characteristics that the catalyst is remarkably improved in storage stability, particularly excellent in maintainability of catalytic activity and extremely excellent in handleability and handling stability.

Accordingly, the hydrogenation catalysts of the first, second, third, fourth and fifth inventions are those which have been freed of the faults of the conventional, homogeneous hydrogenation catalysts and those with which various olefinically unsaturated compounds including non-polymeric compounds and polymeric compounds can be easily and selectively hydrogenated to a high degree of hydrogenation, with a high efficiency and with a good reproducibility without being affected by the conditions for preparing the catalysts.

Olefinically Unsaturated Compound

The olefinically unsaturated compounds to be hydrogenated with the hydrogenation catalysts of the first, second, third, fourth and fifth inventions are those having at least one olefinic carbon-carbon unsaturated bond and their molecular weights are not critical and the compounds may be non-polymeric compounds or polymeric compounds.

As the olefinically unsaturated, non-polymeric compound, there can be mentioned, for example, aliphatic monoolefines such as ethylene, propylene, butene-1, pentene-1, hexene-1, heptene-1, octene-1, isomers thereof and the like; alicyclic monoolefines such as cyclopentene, methylcyclopentenes, cyclohexene, methylcyclohexenes and the like; aliphatic diolefines such as 1,3-butadiene, isoprene, 2,3-dimethyl-1,3-butadiene, 1,3-pentadiene, 2-methyl-1,3-pentadiene, 1,3-hexadiene, 1,3-octadiene, 4,5-diethyl-1,3-octadiene, 3-n-butyl-1,3-octadiene, isomers thereof and the like; alicyclic diolefines such as cyclopentadiene, 1,3-cyclohexadiene, 1,3-cycloheptadiene, 1,3-cyclooctadiene, isomers thereof and the like; side chain-olefinically unsaturated, aromatic compounds such as styrene, α-methylstyrene, divinylbenzene, diisopropenyl-benzene and the like; olefinically unsaturated fatty acids such as oleic acid, linoleic acid, linolenic acid and the like and their derivatives; olefinically unsaturated, liquid oligomers; and the like.

As the olefinically unsaturated, polymeric compound, there can be mentioned, for example, (co)polymers of conjugated diene monomers, conjugated diene monomer/monolefinically unsaturated monomer copolymers, (co)

polymers obtained by ring-opening polymerization of alicyclic monoolefine monomers and, in addition, ethylene/-propylene/non-conjugated diene monomer copolymers, unsaturated polyesters and the like. Among these olefinically unsaturated, polymeric compounds, preferable are (co) polymers of conjugated diene monomers, conjugated diene monomer/monoolefinically unsaturated monomer copolymers in the respect that they are hydrogenated to give excellent elastomers or thermoplastic elastomers.

As the above-mentioned conjugated diene monomers, there can be mentioned generally those monomers having 4 to 12 carbon atoms, and specifically 1,3-butadiene, isoprene, 2,3-dimethyl-1,3-butadiene, 1,3-pentadiene, 2-methyl-1,3-pentadiene, 1,3-hexadiene, 1,3-octadiene, 4,5-diethyl-1,3-octadiene, 3-n-butyl-1,3-octadiene and the like. Among them, 1,3-butadiene and/or isoprene is particularly preferable because elastomers or thermoplastic elastomers having excellent physical properties which meet high industrial needs are obtained.

As the monoolefinically unsaturated monomer to be copolymerized with the conjugated diene monomer, vinyl aromatic monomers are preferable, and specific examples thereof include styrene, a-methylstyrene, o-methylstyrene, m-methylstyrene, p-methylstyrene, p-t-butylstyrene, divinylbenzene, diisopropenylbenzene, 1,1-diphenylethylene, N,N-dimethyl-p-aminostyrene, N1,N-diethyl-p-aminostyrene and the like, and styrene and/or α-methylstyrene is particularly preferable.

As examples of the conjugated diene monomer/vinyl aromatic monomer copolymer, there can be mentioned 1,3-butadiene/styrene copolymer, isoprene/styrene copolymer, 1,3-butadiene/isoprene/styrene copolymer, 1,3-butadiene/α-methylstyrene copolymer, isoprene/α-methylstyrene copolymer, 1,3-butadiene/isoprene/α-methylstyrene copolymer, 1,3-butadiene/styrene/α-methylstyrene copolymer, isoprene/styrene/α-methylstyrene copolymer, 1,3-butadiene/isoprene/styrene/α-methylstyrene copolymer and the like. Among them, butadiene/styrene copolymer, isoprene/styrene copolymer and butadiene/isoprene/styrene copolymer are most preferable because they are hydrogenated to give hydrogenated copolymers having a high industrial value. The conjugated diene monomer/vinyl aromatic monomer copolymer may be in the form of a random copolymer, a block copolymer or a tapered block copolymer (namely, a block copolymer having at least one block in which the vinyl aromatic monomer content increases or decreases gradually along the polymer chain).

Process for Hydrogenating Olefinically Unsaturated Compound

The process for hydrogenating an olefinically unsaturated compound of the sixth invention comprises contacting an olefinically unsaturated compound with hydrogen in the presence of the hydrogenation catalyst of the first, second, third, fourth or fifth invention in an inert, organic solvent.

The term "inert, organic solvent" referred to herein means an organic solvent which does not react with any component participating in the hydrogenation reaction.

As preferable inert, organic solvents, there can be mentioned non-aromatic, organic solvents, for example, aliphatic hydrocarbons such as n-pentane, n-hexane, n-heptane, n-octane and the like; alicyclic hydrocarbons such as cyclohexane, cycloheptane, cyclooctane and the like; ethers such as diethyl ether, tetrahydrofuran and the like; etc.

These non-aromatic, organic solvents can be used alone or in admixture of two or more.

Moreover, when the hydrogenation reaction is conducted under such conditions that the unsaturated bonds of the aromatic ring are not hydrogenated, aromatic hydrocarbons such as benzene, toluene, o-xylene, m-xylene, p-xylene, ethylbenzene and the like can be used as the inert organic solvent.

These aromatic hydrocarbons can be used alone or in admixture of two or more, and can be used in admixture with the above-mentioned non-aromatic, organic solvents.

When the olefinically unsaturated compound to be hydrogenated is a living polymer obtained by living, anionic polymerization of a conjugated diene monomer alone or together with a vinyl aromatic monomer in the presence of, for example, an organic alkali metal or an organic alkaline earth metal as an initiator, the above living polymer per se falls under the category of the constituent (B) in the second, third, fourth and fifth inventions. In this case, said living polymer per se can be used as the constituent (B), and if necessary, the lithium hydride obtained by reacting at least part of the living lithium contained in the living polymer with hydrogen to deactivate the same can be used as a part or the whole of the constituent (B).

As the deactivating agent for deactivating the living lithium contained in the living polymer, known deactivating agents can be used, and alcohol compounds, ketone compounds and the like can also be adequately used. The amount of the deactivating agent used may be not less than or more than the amount equimolar to the living lithium contained in the living polymer; however, when an excess of the alcohol compound or ketone compound is used as the deactivating agent, the residue of these compounds can also be used as a part; or the whole of the constituent (C) in the hydrogenation catalyst of the fifth invention.

In these cases, whether the above living polymer is used as it is as the constituent (B) or is deactivated with hydrogen and then used in the form of lithium hydride which is the constituent (B) or deactivated with a deactivating agent and then used and in what amount hydrogen or deactivating agent is used for deactivating the living lithium are determined considering the above-mentioned proportions of the constituents used in the hydrogenation catalyst.

The hydrogenation reaction is usually carried out by maintaining an inert, organic solvent solution of the olefinically unsaturated compound placed in a reactor in a hydrogen gas or inert gas atmosphere at a certain temperature, adding the hydrogenation catalyst with or without stirring and introducing a hydrogen gas at a certain pressure.

The "inert gas" referred to herein means a gas which does not react with any constituent participating in the hydrogenation reaction, for example, nitrogen, helium, neon, argon or the like. Incidentally, air and oxygen are not desirable because they oxidize the catalyst components to deactivate the catalyst.

In the hydrogenation reaction, the order of adding the constituents of the hydrogenation catalyst and the method of adding the hydrogenation catalyst are not critical. Accordingly, a hydrogenation catalyst previously prepared in a catalyst-preparing tank separate from a reactor may be fed to the reactor or each of the constituents of the hydrogenation catalyst may be fed separately to the reactor.

When the hydrogenation catalyst is previously prepared in a catalyst-preparing tank, the atmosphere in the catalyst-preparing tank may be a hydrogen gas or an inert gas. The temperature for preparing the catalyst and the temperature for storing the catalyst after its preparation are preferably −50 to +100° C., more preferably −20 to +80° C. The time necessary for the catalyst preparation is varied depending upon the temperature; however, for example, at 25° C., the time is preferably about several seconds to 60 days, more preferably about 1 minute to 20 days. The hydrogenation catalyst thus prepared is safe even in air in some cases; however, it is preferable to handle the same in a hydrogen gas or in an inert atmosphere such as an inert gas.

Moreover, when a hydrogenation catalyst is previously prepared in a catalyst-preparing tank, it is necessary to transfer the hydrogenation catalyst prepared to a reactor, and this transference is preferably conducted in a hydrogen gas atmosphere. The transference of the hydrogenation catalyst to the reactor is preferably effected at a temperature of −30 to +100° C., more preferably −10 to +90° C., and it is desirable to effect the transference just before the initiation of the reaction.

Each of the constituents (A), (A'), (B) and (C) of the hydrogenation catalysts is preferably used in solution because this is easy to handle. In this case, as the solvent, any solvent can be used as far as it does not react with any component participating in the hydrogenation reaction; however, the same solvent as the above-mentioned inert, organic solvent used in the hydrogenation reaction is preferred.

When a hydrogenation catalyst is previously prepared in a catalyst-preparing tank, it is possible to add a compound having a double bond, for example, butadiene, styrene, isoprene, ethylene, propylene, butylene or the like as a stabilizer for the catalyst. Moreover, the compound having a double bond may be added as a catalyst stabilizer during the hydrogenation reaction.

The amount of the hydrogenation catalyst used in the hydrogenation of the olefinically unsaturated compound is preferably 0.001 to 50 millimoles in terms of the transition metal contained in the constituent (A) and/or the constituent (A'), per 100 g of the olefinically unsaturated compound, and when the amount is in this range, in the case of the conjugated diene monomer/vinyl aromatic monomer copolymer, it is possible to preferentially hydrogenate the conjugated diene portion without hydrogenating the unsaturated bonds in the aromatic ring, and a very high hydrogenation selectivity is realized. Incidentally, even when the amount of the constituent (A) and/or the constituent (A') used exceeds 50 millimoles, the hydrogenation is possible, but the use of the catalyst constituent or constituents in a larger amount than the necessary amount is uneconomical and, in addition, such a disadvantage is caused that the step of ash-removal or catalyst-removal after the reaction is complicated. The amount of the constituent (A) and/or the constituent (A') used in the case of selectively and quantitatively hydrogenating the conjugated diene monomer/vinyl aromatic monomer copolymer is preferably 0.01 to 5 millimoles.

The hydrogenation is carried out using molecular oxygen, preferably by introducing a hydrogen gas into the reactor. Moreover, the hydrogenation is preferably effected with stirring, whereby the hydrogen introduced can be sufficiently quickly contacted with the olefinically unsaturated compound.

The reaction temperature in the hydrogenation is preferably 0 to 200° C., more preferably 20 to 180° C. In this case, when the reaction temperature is lower than 0° C., the reaction velocity becomes low and the necessary reaction time becomes longer and a larger amount of the catalyst becomes necessary, which is uneconomic. On the other hand, when the temperature exceeds 200° C., there is such a fear of simultaneously causing undesirable side reactions, decomposition of the olefinically unsaturated compound, gelation and the like and also deactivating the catalyst, so that such temperatures are not desirable.

The hydrogen gas pressure in the hydrogenation is preferably in the range of 1 to 100 $kg/cm^2$. In this case, at a hydrogen gas pressure of less than 1 $kg/cm^2$, the reaction velocity becomes low and the progress of hydrogenation reaction reaches substantially the uppermost limit and the achievement of a high degree of hydrogenation tends to be made difficult. On the other hand, when the pressure exceeds 100 $kg/cm^2$, there is a fear of causing undesirable side reactions and gelation of olefinically unsaturated compound. In addition, since the hydrogenation reaction is substantially completed in the course of elevating the pressure to 100 $kg/cm^2$, it is substantially meaningless to elevate the pressure over 100 $kg/cm^2$. The hydrogen gas pressure is more preferably in the range of 2 to 30 $kg/cm^2$. The optimum hydrogen gas pressure is varied in correlation with the amount of the catalyst used and it is substantially suitable that when the amount of the catalyst used is smaller, the hydrogen pressure is shifted to a higher pressure side. Moreover, the reaction time for hydrogenation is preferably several seconds to 50 hours. The hydrogen gas pressure and the reaction time in the hydrogenation are appropriately varied in the above-mentioned ranges depending upon the desired degree of hydrogenation.

The hydrogenation process of the sixth invention has firstly such characteristics that the catalytic activity of the hydrogenation catalyst used is very high and the necessary amount of the catalyst is small, so that even when the reaction product is a polymer and the hydrogenation catalyst remains as it is in the polymer, the remaining catalyst does not affect remarkably adversely the properties of the polymer and a major amount of the remaining catalyst is decomposed or removed in the course of the separation of the polymer and consequently does not remain in the polymer, and that the remaining catalyst is required to be neither subjected to ash-removal nor removed and the hydrogenation can be carried out by a very simple process.

Secondly, the above hydrogenation process has such characteristics that the hydrogenation catalyst used is excellent in thermal resistance and the reaction velocity is hardly reduced even at a relatively low temperature, so that the olefinically unsaturated compound can be hydrogenated with a high efficiency even under mild reaction conditions in a broad temperature range and simultaneously the reaction temperature can be set at a high point and hence the reaction velocity can be made high, and that even when the olefinically unsaturated polymeric compound is hydrogenated the viscosity of the reaction system decreases to enable the reaction time to be greatly shortened.

Thirdly, the above hydrogenation process has such characteristics that the hydrogenation catalyst used is extremely excellent in storage stability and maintainability of catalytic activity and that even when the catalyst is stored for, e.g., several months, it substantially maintains the initial catalytic activity and is hardly affected by the co-existing impurities, so that the olefinically unsaturated compound can be easily hydrogenated.

Accordingly, by the hydrogenation process of the sixth invention, particularly the conjugated diene portion of a (co)polymer of conjugated diene monomer or a conjugated diene/vinyl aromatic monomer copolymer can be hydrogenated with a high efficiency to a high degree of hydrogenation to produce very advantageously an elastomer or thermoplastic elastomer having a high industrial value.

When the olefinically unsaturated compound to be hydrogenated by the sixth invention is a polymeric compound, there is obtained an elastomer, thermoplastic elastomer or thermoplastic resin which is excellent in weather resistance, thermal resistance, oxidation resistance and the like. However, these polymers may, if necessary, have blended therewith an ultraviolet absorber, an oil, a primer and the like and can be used in blend with another elastomer, thermoplastic resin or the like.

DESCRIPTION OF PREFERRED EMBODIMENTS

Examples are shown below to more specifically explain modes for carrying out this invention. However, this invention should not be construed to be limited to the Examples.

Reference Example 1

In a 500-milliliter, three-necked flask which had been sufficiently dried and purged with nitrogen were placed 185 millimoles of bis(cyclopentadienyl)titanium chloride and 200 milliliters of dehydrated diethyl ether.

Separately, in a constant pressure dropping funnel purged with nitrogen was placed 100 milliliters of a solution in dehydrated diethyl ether of a reaction product [referred to hereinafter as Compound (I)] of 370 millimoles of tetrahydrofurfuryl alcohol with 370 millimoles of n-butyllithium.

Subsequently, the three-necked flask was cooled to −20° C., the solution of Compound (I) in the constant pressure dropping funnel was dropped slowly into the flask over about 20 minutes while the contents of the flask were violently stirred with a magnetic stirrer and, after completion of the dropwise addition, the stirring was continued for 20 minutes. Subsequently, 5 milliliters of dichloromethane was added for decomposing the excess of Compound (I) and the temperature was slowly returned to room temperature. Subsequently, the lithium chloride produced as a by-product was removed by filtration and the diethyl ether was removed by distillation. Thereafter, 200 milliliters of dehydrated dichloromethane was added and insolubles were then removed by filtration, after which the dichloromethane was removed by distillation. Subsequently, the reaction product was evaporated under reduced pressure to dryness to obtain 144 millimoles of bis(cyclopentadienyl)titanium bis (tetrahydrofurfuryloxy) represented by the above-mentioned formula (7-1). This compound is referred to hereinafter as Compound (A1).

Reference Example 2

The same procedure as in Reference Example 1 was repeated, except that a reaction product of 370 millimoles of furfuryl alcohol with 370 millimoles of n-butyllithium was substituted for the Compound (I), to obtain 140 millimoles of a compound represented by the above-mentioned formula (7-2). This compound is referred to hereinafter as Compound (A2).

Reference Example 3

The same procedure as in Reference Example 1 was repeated, except that a reaction product of 370 millimoles of furfural with 370 millimoles of n-butyllithium was substituted for the Compound (1) to obtain 137 millimoles of a compound represented by the above-mentioned formula (7-5). This compound is referred to hereinafter as Compound (A3).

Reference Example 4

The same procedure as in Reference Example 1 was repeated, except that a reaction product of 370 millimoles of indole with 370 millimoles of n-butyllithium was substituted for the Compound (I) to obtain 140 millimoles of a compound represented by the above-mentioned formula (7-7). This compound is referred to hereinafter as Compound (A4).

Reference Example 5

The same procedure as in Reference Example 1 was repeated, except that a reaction product of 370 millimoles of piperidine with 370 millimoles of n-butyllithium was substituted for the Compound (I), to obtain 138 millimoles of a compound represented by the above-mentioned formula (7-6). This compound is referred to hereinafter as Compound (A5).

Reference Example 6

The same procedure as in Reference Example 1 was repeated, except that a reaction product of 370 millimoles of imidazole with 370 millimoles of n-butyllithium was substituted for the Compound (I) to obtain 135 millimoles of a compound represented by the above-mentioned formula (7-8). This compound is referred to hereinafter as Compound (A6).

Reference Example 7

The same procedure as in Reference Example 1 was repeated, except that a reaction product of 370 millimoles of 2-pyridinemethanol with 370 millimoles of n-butyllithium was substituted for the Compound (I) to obtain 136 millimoles of a compound represented by the above-mentioned formula (7-3). This compound is referred to hereinafter as Compound (A7).

Reference Example 8

The same procedure as in Reference Example 1 was repeated, except that a reaction product of 370 millimoles of morpholine with 370 millimoles of n-butyllithium was substituted for the Compound (I) to obtain 140 millimoles of a compound represented by the above-mentioned formula (7-9). This compound is referred to hereinafter as Compound (A8).

Reference Example 9

The same procedure as in Reference Example 1 was repeated, except that a reaction product of 370 millimoles of 1-methylpiperazine with 370 millimoles of n-butyllithium was substituted for the Compound (I) to obtain 140 millimoles of a compound represented by the above-mentioned formula (7-10). This compound is referred to hereinafter as Compound (A9).

Reference Example 10

The same procedure as in Reference Example 1 was repeated, except that a reaction product of 185 millimoles of tetrahydrofurfuryl alcohol with 185 millimoles of n-butyllithium was substituted for the Compound (I) to obtain 144 millimoles of a compound represented by the above-mentioned formula (7-11). This compound is referred to hereinafter as Compound (A10).

Reference Example 11

The same procedure as in Reference Example 1 was repeated, except that a reaction product of 185 millimoles of furfuryl alcohol with 185 millimoles of n-butyllithium was substituted for the Compound (I) to obtain 143 millimoles of a compound represented by the above-mentioned formula (7-12). This compound is referred to hereinafter as Compound (A11).

Reference Example 12

The same procedure as in Reference Example 1 was repeated, except that a reaction product of 185 millimoles of indole with 185 millimoles of n-butyllithium was substituted for the Compound (I) to obtain 139 millimoles of a compound represented by the above-mentioned formula (7-13). This compound is referred to hereinafter as Compound (A12).

Reference Example 13

The same procedure as in Reference Example 1 was repeated, except that a reaction product of 185 millimoles of imidazole with 185 millimoles of n-butyllithium was substituted for the Compound (I) to obtain 141 millimoles of a compound represented by the above-mentioned formula (7-14). This compound is referred to hereinafter as Compound (A13).

Reference Example 14

The same procedure as in Reference Example 1 was repeated, except that a reaction product of 185 millimoles of morpholine with 185 millimoles of n-butyllithium was substituted for the Compound (I) to obtain 142 millimoles of a compound represented by the above-mentioned formula (7-15). This compound is referred to hereinafter as Compound (A14).

Reference Example 15

The same procedure as in Reference Example 1 was repeated, except that a reaction product of 185 millimoles of 1-methylpiperazine with 185 millimoles of n-butyllithium was substituted for the Compound (I) to obtain 140 millimoles of a compound represented by the above-mentioned formula (7-16). This compound is referred to hereinafter as Compound (A15).

Reference Example 16

The same procedure as in Reference Example 1 was repeated, except that bis(n-butylcyclopentadienyl)titanium dichloride was substituted for the bis(cyclopentadienyl) titanium dichloride to obtain 140 millimoles of a compound represented by the above-mentioned formula (8-4). This compound is referred to hereinafter as Compound (A16).

Reference Example 17

The same procedure as in Reference Example 1 was repeated, except that bis(n-butylcyclopentadienyl)titanium dichloride was substituted for the bis(cyclopentadienyl) titanium dichloride and a reaction product of 185 millimoles of furfuryl alcohol with 185 millimoles of n-butyllithium was substituted for the Compound (I) to obtain 145 millimoles of a compound represented by the above-mentioned formula (8-5). This compound is referred to hereinafter as Compound (A17).

Reference Example 18

The same procedure as in Reference Example 1 was repeated, except that bis(2-ethylhexylcyclopentadienyl) titanium dichloride was substituted for the bis(cyclopentadienyl)titanium dichloride to obtain 143 millimoles of a compound represented by the above-mentioned formula (9-1). This compound is referred to hereinafter as Compound (A18).

Reference Example 19

The same procedure as in Reference Example 1 was repeated, except that bis(2-ethylhexylcyclopentadienyl) titanium dichloride was substituted for the bis (cyclopentadienyl)titanium dichloride and a reaction product of 185 millimoles of furfuryl alcohol with 185 millimoles of n-butyllithium was substituted for the Compound (I) to obtain 142 millimoles of a compound represented by the above-mentioned formula (9-2). This compound is referred to hereinafter as Compound (A19).

Reference Example 20

The same procedure as in Reference Example 1 was repeated, except that [(dimethylsilylene)-bis($\eta^5$-2,4-cyclopentadien-1-ylidene]titanium dichloride was substituted for the bis(cyclopentadienyl)titanium dichloride to obtain 138 millimoles of a compound represented by the above-mentioned formula (14-1). This compound is referred to hereinafter as Compound (A20).

Reference Example 21

The same procedure as in Reference Example 1 was repeated, except that [(dimethylsilylene)-bis($\eta^5$-2,4-cyclopentadien-1-ylidene]titanium dichloride was substituted for the bis(cyclopentadienyl)titanium dichloride and a reaction product of 370 millimoles of furfuryl alcohol with 370 millimoles of n-butyllithium was substituted for the Compound (I) to obtain 141 millimoles of a compound represented by the above-mentioned formula (14-2). This compound is referred to hereinafter as Compound (A21).

Reference Example 22

The same procedure as in Reference Example 1 was repeated, except that [(dimethylsilylene)-bis($\eta^5$-2,4-cyclopentadien-1-ylidene]titanium dichloride was substituted for the bis(cyclopentadienyl)titanium dichloride and a reaction product of 370 millimoles of morpholine with 370 millimoles of n-butyllithium was substituted for the Compound (I) to obtain 145 millimoles of a compound represented by the above-mentioned formula (14-7). This compound is referred to hereinafter as Compound (A22).

Reference Example 23

The same procedure as in Reference Example 1 was repeated, except that [(dimethylsilylene)-bis($\eta^5$-2,4-cyclopentadien-1-ylidene]titanium dichloride was substituted for the bis(cyclopentadienyl)titanium dichloride and a reaction product of 185 millimoles of tetrahydrofurfuryl alcohol with 185 millimoles of n-butyllithium was substituted for the Compound (I) to obtain 145 millimoles of a compound represented by the above-mentioned formula (14-9). This compound is referred to hereinafter as Compound (A23).

Reference Example 24

The same procedure as in Reference Example 1 was repeated, except that [(dimethylsilylene)-bis($\eta^5$-2,4-cyclopentadien-1-ylidene]titanium dichloride was substituted for the bis(cyclopentadienyl)titanium dichloride and a reaction product of 185 millimoles of furfuryl alcohol with 185 millimoles of n-butyllithium was substituted for the Compound (I) to obtain 145 millimoles of a compound represented by the above-mentioned formula (14-10). This compound is referred to hereinafter as Compound (A24).

Reference Example 25

The same procedure as in Reference Example 1 was repeated, except that a reaction product of 370 millimoles of ethanol with 370 millimoles of n-butyllithium was substituted for the Compound (I) to obtain 142 millimoles of bis(cyclopentadienyl)titanium bis(ethoxy). This compound is referred to hereinafter as Compound (a1).

Reference Example 26

The same procedure as in Reference Example 1 was repeated, except that a reaction product of 370 millimoles of propanol with 370 millimoles of n-butyllithium was substituted for the Compound (I) to obtain 140 millimoles of bis(cyclopentadienyl)titanium bis(n-propoxy). This compound is referred to hereinafter as Compound (a2).

Reference Example 27

The same procedure as in Reference Example 1 was repeated, except that a reaction product of 370 millimoles of n-butanol with 370 millimoles of n-butyllithium was substituted for the Compound (I) to obtain 140 millimoles of bis(cyclopentadienyl)titanium bis(n-butoxy). This compound is referred to hereinafter as Compound (a3).

Reference Example 28

The same procedure as in Reference Example 1 was repeated, except that a reaction product of 370 millimoles of i-propanol with 370 millimoles of n-butyllithium was substituted for the Compound (I) to obtain 140 millimoles of bis(cyclopentadienyl)titanium bis(i-propoxy). This compound is referred to hereinafter as Compound (a4).

Reference Example 29

The same procedure as in Reference Example 1 was repeated, except that a reaction product of 370 millimoles of n-pentanol with 370 millimoles of n-butyllithium was substituted for the Compound (I) to obtain 142 millimoles of bis(cyclopentadienyl)titanium bis(n-pentyloxy). This compound is referred to hereinafter as Compound (a5).

EXAMPLE 1

In a 10-liter autoclave were placed 59.5 moles of deaerated and dehydrated cyclohexane and 18.5 moles of 1,3-butadiene and thereafter 0.234 mole of tetrahydrofuran and 15.2 millimoles of n-butyllithium were added to them, after which the resulting mixture was subjected to temperature-elevating polymerization at a polymerization initiating temperature of 50° C. to polymerize the same until the polymerization conversion became approximately 100%. The amount of the living lithium in the reaction mixture obtained, as measured by an acid-base titration, was 13.76 millimoles.

Subsequently, a hydrogen gas was fed to the autoclave in excess of the number of moles of the living lithium and the mixture was then stirred for about 2 hours to be subjected to reaction so that the amount of the living lithium became nil, thereby obtaining 13.76 millimoles of lithium hydride.

Subsequently, 1.6 millimoles of Compound (A1) dissolved in 10 milliliters of toluene was placed in the autoclave in a nitrogen atmosphere and the resulting mixture was then subjected to reaction at 100° C. for 90 minutes with stirring while a hydrogen gas was fed to the autoclave at a pressure of 8.0 kg/cm$^2$.

The reaction product obtained was a polymer having a degree of hydrogenation of 99% as measured by $^1$H-NMR spectrum (100 MHz), a 1,2-configuration content before hydrogenation of 39% and an Mn value of 110,000.

The above results are shown in Table 1.

EXAMPLE 2

In a 10-liter autoclave were placed 59.5 moles of deaerated and dehydrated cyclohexane and 18.5 moles of 1,3-butadiene and thereafter 0.234 mole of tetrahydrofuran and 17.2 millimoles of n-butyllithium were added thereto, after which the resulting mixture was subjected to temperature-elevating polymerization at a polymerization-initiating temperature of 50° C. to polymerize the same until the polymerization conversion became approximately 100%. Thereafter, 3.44 millimoles of tetrachlorosilane was added to the reaction mixture and the mixture was then subjected to coupling reaction. The amount of the living lithium in the resulting reaction mixture, as measured by an acid-base titration, was 1.4 millimoles.

Subsequently, a hydrogen gas was fed to autoclave in excess of the number of moles of the living lithium and the mixture was then stirred for about 2 hours to be subjected to reaction until the amount of the living lithium became nil, thereby obtaining 1.4 millimoles of lithium hydride.

Subsequently, 1.6 millimoles of Compound (A1) dissolved in 10 milliliters of toluene was placed in the autoclave in a nitrogen atmosphere and the resulting mixture was then subjected to reaction at 100° C. for 90 minutes with stirring while a hydrogen gas was fed to the autoclave at a pressure of 8.0 kg/cm$^2$.

The reaction product obtained was a polymer having a degree of hydrogenation of 99% as measured by $^1$H-NMR spectrum (100 MHz), a 1,2-configuration content before hydrogenation of 39%, an Mn value before coupling of 110,000 and an Mn value after coupling of 340,000. The weight ratio of the uncoupled polymer to the coupled polymer was 1:4 as calculated from the results of measurement by a gel permeation chromatography.

The above results are shown in Table 1.

EXAMPLE 3

In a 10-liter autoclave were placed 59.5 moles of deaerated and dehydrated cyclohexane, 2.88 moles of styrene and 12.96 moles of 1,3-butadiene and thereafter 3.125 moles of tetrahydrofuran and 8.6 millimoles of n-butyllithium were added to them, after which the resulting mixture was subjected to temperature-elevating polymerization at a polymerization-initiating temperature of 10° C. to polymerize the same until the polymerization conversion became approximately 100%. The amount of the living lithium in this reaction mixture, as measured by an acid-base titration, was 4.29 millimoles.

Subsequently, 1.5 millimoles of Compound (A1) dissolved in 10 milliliters of toluene was placed in the autoclave in a nitrogen atmosphere and the resulting mixture was then subjected to reaction with stirring at 100° C. for 80 minutes while a hydrogen gas was fed to the autoclave at a pressure of 8.0 kg/cm$^2$.

The reaction product obtained was a polymer having a degree of hydrogenation in the butadiene portion of 99% as measured by $^1$H-NMR spectrum (100 MHz), a 1,2-configuration content in the butadiene portion before hydrogenation of 78% and an Mn of 320,000 in which polymer the unsaturated bonds of the aromatic rings were substantially not hydrogenated.

The above results are shown in Table 1.

EXAMPLE 4

After polymerization was conducted in the same manner as in Example 3, carbon dioxide was fed to the autoclave in excess of the number of moles of the living lithium and the mixture was then stirred for about 2 hours to be subjected to reaction until the amount of the living lithium became nil, thereby producing 4.29 millimoles of a carboxylithium-terminated styrene/1,3-butadiene copolymer.

Subsequently, 1.5 millimoles of Compound (A1) dissolved in 10 milliliters of toluene was fed to the autoclave in a nitrogen atmosphere and the resulting mixture was then subjected to reaction with stirring at 100° C. for 80 minutes while a hydrogen gas was fed to the autoclave at a pressure of 8.0 kg/cm$^2$.

The reaction product obtained was a polymer having a degree of hydrogenation in the butadiene portion of 98% as measured by $^1$H-NMR spectrum (100 MHz) in which polymer the unsaturated bonds of the aromatic rings were substantially not hydrogenated and the proportion of addition of a carboxyl group to the polymer terminals was 40% based on the amount of the living lithium.

The above results are shown in Table 1.

EXAMPLE 5

After polymerization was conducted in the same manner as in Example 3, 4.29 millimoles of benzophenone dissolved in 10 milliliters of toluene was added.

Subsequently, 1.5 millimoles of Compound (A1) dissolved in 10 milliliters of toluene was added to the resulting mixture in a nitrogen atmosphere and the mixture was then subjected to reaction with stirring at 100° C. for 80 minutes while a hydrogen gas was fed to the autoclave at a pressure of 8.0 kg/cm$^2$.

The reaction product obtained was a polymer having a degree of hydrogenation in the butadiene portion of 99% as measured by $^1$H-NMR spectrum (100 MHz) in which polymer the unsaturated bonds of the aromatic rings were substantially not hydrogenated.

The above results are shown in Table 1.

EXAMPLE 6

In a 10-liter autoclave were placed 59.5 moles of deaerated and dehydrated cyclohexane and 1.44 moles of styrene and thereafter 3.125 moles of tetrahydrofuran and 8.6 millimoles of n-butyllithium were fed to the autoclave, after which the resulting mixture was subjected to constant temperature polymerization at 50° C. to polymerize the same until the polymerization conversion became approximately 100%. Subsequently, the reaction mixture was cooled to 10° C. and thereafter 12.96 moles of 1,3-butadiene was placed in the autoclave, after which the resulting mixture was subjected to temperature-elevating polymerization to polymerize the same until the polymerization conversion became approximately 100%. Thereafter, the reaction mixture was heated to 50° C. and 1.44 moles of styrene was then placed in the autoclave, after which the resulting mixture was subjected to constant temperature polymerization to polymerize the same until the polymerization conversion became approximately 100%. The amount of the living lithium in this reaction mixture, as measured by an acid-base titration, was 4.3 millimoles.

Subsequently, a hydrogen gas was fed to the autoclave in excess of the number of moles of the living lithium and the mixture was then stirred for about 2 hours to be subjected to reaction until the amount of the living lithium became nil, thereby producing 4.3 millimoles of lithium hydride.

Subsequently, 0.15 millimoles of Compound (A1) dissolved in 10 milliliters of toluene was placed in the autoclave in a nitrogen atmosphere and the resulting mixture was then subjected to reaction with stirring at 110° C. for 180 minutes while a hydrogen gas was fed at a pressure of 8.0 kg/cm$^2$.

The reaction product obtained was a polymer having a degree of hydrogenation in the butadiene portion of 96% as measured by $^1$H-NMR spectrum (100 MHz), a 1,2-configuration content in the butadiene portion before hydrogenation of 85% and an Mn value of 295,000 in which polymer the unsaturated bonds of the aromatic rings were substantially not hydrogenated. This Example shows that when the amount of the constituent (A) is small, the reaction velocity is somewhat lowered.

The above results are shown in Table 1.

EXAMPLE 7

After polymerization was conducted in the same manner as in Example 6, 35 millimoles of Compound (A1) dissolved in 10 milliliters of toluene was added to the reaction mixture and the resulting mixture was then subjected to reaction at 100° C. for 20 minutes with stirring while a hydrogen gas was fed at a pressure of 8.0 kg/cm$^2$.

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated. This Example shows that even when the amount of the constituent (A) is large, the hydrogenation is not obstructed and the reaction velocity is rather increased in some cases.

The above results are shown in Table 1.

EXAMPLE 8

After polymerization was conducted in the same manner as in Example 6, the reaction product obtained was added to ethanol and the polymer obtained was purified by reprecipitation. Thereafter, the purified polymer was sufficiently dried and redissolved in 59.5 moles of deaerated and dehydrated cyclohexane in a 10-liter autoclave in s nitrogen atmosphere.

Subsequently, 2.8 millimoles of triethylaluminum was added to the resulting solution and 1.4 millimoles of Compound (A1) dissolved in 10 milliliters of toluene was then added thereto, after which the resulting mixture was subjected to reaction at 100° C. for 70 minutes with stirring while a hydrogen gas was fed at a pressure of 8.0 kg/cm$^2$.

The reaction product obtained was a polymer having a degree of hydrogenation in the butadiene portion of 99% as measured by $^1$H-NMR spectrum (100 MHz) in which polymer the unsaturated bonds of the aromatic rings were substantially not hydrogenated.

The above results are shown in Table 1.

EXAMPLE 9

In the same manner as in Example 8, polymerization, purification by reprecipitation and redissolution were conducted.

Subsequently, 2.8 millimoles of dimethylmagnesium was added to the solution obtained and 1.4 millimoles of Compound (A1) dissolved in 10 milliliters of toluene was then added thereto, after which the resulting mixture was subjected to reaction at 90° C. for 80 minutes with stirring while a hydrogen gas was fed at a pressure of 8.0 kg/cm$^2$.

The reaction product obtained was a polymer having a degree of hydrogenation in the butadiene portion of 99% as measured by $^1$H-NMR spectrum (100 MHz) in which polymer the unsaturated bonds of the aromatic rings were substantially not hydrogenated.

The above results are shown in Table 1.

EXAMPLE 10

In the same manner as in Example 8, polymerization, purification by reprecipitation and redissolution were conducted.

Subsequently, 28 millimoles of n-butyllithium was added to the solution obtained and 1.4 millimoles of Compound (A1) dissolved in 10 milliliters of toluene was then added thereto, after which the resulting mixture was subjected to reaction at 90° C. for 40 minutes with stirring while a hydrogen gas was fed at a pressure of 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 1.

EXAMPLE 11

In the same manner as in Example 8, polymerization, purification by reprecipitation and redissolution were conducted.

Subsequently, 0.7 millimole of n-butyllithium was added to the solution obtained end 1.4 millimoles of Compound (A1) dissolved in 10 milliliters of toluene was then added thereto, after which the resulting mixture was subjected to reaction with stirring at 100° C. for 90 minutes while a hydrogen gas was fed at a pressure of 8.0 kg/cm$^2$.

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 12

In the same manner as in Example 8, polymerization, purification by reprecipitation and redissolution were conducted.

Subsequently, 2.8 millimoles of n-butyllithium was added to the solution obtained and thereafter 2.8 millimoles of ethanol was added thereto.

Subsequently, 1.4 millimoles of Compound (A1) dissolved in 10 milliliters of toluene was added thereto and the resulting mixture was then subjected to reaction with stirring at 100° C. for 70 minutes while a hydrogen gas was fed at a pressure of 8.0 kg/cm$^2$.

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 13

In the same manner as in Example 8, polymerization, purification by reprecipitation and redissolution were conducted.

Subsequently, 2.8 millimoles of n-butyllithium was added to the solution obtained and thereafter 2.8 millimoles of acetone was added thereto.

Subsequently, 1.4 millimoles of Compound (A1) dissolved in 10 milliliters of toluene was added to the resulting mixture and the mixture was then subjected to reaction with stirring at 110° C. for 60 minutes while a hydrogen gas was fed at a pressure 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 1.

EXAMPLE 14

In the same manner as in Example 8, polymerization, purification by reprecipitation and redissolution were conducted.

Subsequently, 2.8 millimoles of n-butyllithium was added to the solution obtained and then 0.056 millimole of benzophenone was added thereto.

Subsequently, 1.4 millimoles of Compound (A1) dissolved in 10 milliliters of toluene was added to the resulting mixture and the mixture wets then subjected to reaction with stirring at 100° C. for 60 minutes while a hydrogen gas was fed at a pressure of 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic ring were substantially not hydrogenated.

The above results are shown in Table 1.

EXAMPLE 15

In the same manner as in Example 8, polymerization, purification by reprecipitation and redissolution were conducted.

Subsequently, 2.8 millimoles of n-butyllithium was added to the solution and 15 millimoles of benzophenone was then added thereto.

Subsequently, 1.4 millimoles of Compound (A1) dissolved in 10 milliliters of toluene was fed to the resulting mixture and the mixture was then subjected to reaction with stirring at 100° C. for 180 minutes while a hydrogen gas was fed at a pressure of 8.0 kg/cm$^2$.

The reaction product obtained was a polymer having a degree of hydrogenation in the butadiene portion of 96% as measured by $^1$H-NMR spectrum (100 MHz), in which polymer the unsaturated bonds of the aromatic rings were substantially not hydrogenated. This Example shows that when the amount of the constituent (C) is large, the reaction velocity is somewhat lowered.

The above results are shown in Table 1.

EXAMPLE 16

Polymerization and hydrogenation were conducted in the same manner as in Example 1, except that Compound (A2) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 17

Polymerization and hydrogenation were conducted in the same manner as in Example 1, except that Compound (A3) was substituted for the Compound (A1).

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 1.

EXAMPLE 18

Polymerization and hydrogenation were conducted in the same manner as in Example 1, except that Compound (A4) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 19

Polymerization and hydrogenation were conducted in the same manner as in Example 1, except that Compound (A5) was substituted for the Compound (A1).

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 1.

EXAMPLE 20

Polymerization and hydrogenation were conducted in the same manner as in Example 1, except that Compound (A6) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 21

Polymerization and hydrogenation were conducted in the same manner as in Example 1, except that Compound (A7) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 22

Polymerization and hydrogenation were conducted in the same manner as in Example 1, except that Compound (A8) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 23

Polymerization and hydrogenation were conducted in the same manner as in Example 1, except that Compound (A9) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 1.

EXAMPLE 24

Polymerization and hydrogenation were conducted in the same manner as in Example 1, except that Compound (A1) which had been stored for 6 months at room temperature was substituted for the Compound (A1) as the constituent (A) for confirming the storage stability of the catalyst constituents.

The reaction product obtained was a polymer having a degree of hydrogenation in the butadiene portion of 99% as measured by $^1$H-NMR spectrum (100 MHz), by which it was confirmed that Compound (A1) was excellent in storage stability.

The above results are shown in Table 1.

EXAMPLE 25

Polymerization and hydrogenation were conducted in the same manner as in Example 1, except that the hydrogenation temperature and the hydrogenation time were changed to 130° C. and 60 minutes, respectively.

The reaction product obtained was a polymer having a degree of hydrogenation in the butadiene portion of 98% as measured by $^1$H-NMR spectrum (100 MHz) and it was confirmed that the hydrogenation catalyst used showed a high catalytic activity even at more than 100° C. and was excellent in thermal resistance.

The above results are shown in Table 1.

EXAMPLE 26

Polymerization and hydrogenation were conducted in the same manner as in Example 2, except that Compound (A10) was substituted for the Compound (A1) and the hydrogenation temperature and the hydrogenation time were changed to 90° C. and 90 minutes, respectively.

The reaction product obtained was a polymer having a degree of hydrogenation in the butadiene portion of 99% as measured by $^1$H-NMR spectrum (100 MHz), in which polymer the unsaturated bonds in the aromatic rings were substantially not hydrogenated.

The above results are shown in Table 1.

EXAMPLE 27

Polymerization and hydrogenation were conducted in the same manner as in Example 1, except that Compound (A11) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 2.

EXAMPLE 28

Polymerization and hydrogenation were conducted in the same manner as in Example 1, except that Compound (A12) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 2.

EXAMPLE 29

Polymerization and hydrogenation were conducted in the same manner as in Example 1, except that Compound (A13) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 2.

EXAMPLE 30

Polymerization and hydrogenation were conducted in the same manner as in Example 1, except that Compound (A14) was substituted for the Compound (A1).

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLE 31

Polymerization and hydrogenation were conducted in the same manner as in Example 1, except that Compound (A15) was substituted for the Compound (A1).

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLE 32

Polymerization and hydrogenation were conducted in the same manner as in Example 1, except that Compound (A16) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 2.

EXAMPLE 33

Polymerization and hydrogenation were conducted in the same manner as in Example 1, except that Compound (A17) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 2.

EXAMPLE 34

Polymerization and hydrogenation were conducted in the same manner as in Example 1, except that Compound (A18) was substituted for the Compound (A1).

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLE 35

Polymerization and hydrogenation were conducted in the same manner as in Example 1, except that Compound (A19) was substituted for the Compound (A1).

The reaction product obtained was a polymer having a degree of hydrogenation in the butadiene portion of 99% as measured by $^1$H-NMR spectrum (100 MHz), in which polymer the unsaturated bonds of the aromatic rings were substantially not hydrogenated.

The above results are shown in Table 2.

EXAMPLE 36

Polymerization and hydrogenation were conducted in the same manner as in Example 1, except that Compound (A20) was substituted for the Compound (A1).

The reaction product obtained was a polymer having a degree of hydrogenation in the butadiene portion of 99% as measured by 1H-NMR spectrum (100 MHz), in which polymer the unsaturated bonds of the aromatic rings were substantially not hydrogenated.

The above results are shown in Table 2.

EXAMPLE 37

In the same manner as in Example 8, polymerization, purification by reprecipitation and redissolution were conducted.

Subsequently, 1.4 millimoles of Compound (A1) dissolved in 10 milliliters of toluene was added to the solution obtained and the resulting mixture was then subjected to reaction with stirring at 100° C. for 90 minutes while a hydrogen gas was fed at a pressure of 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLE 38

In the same manner as in Example 8, polymerization, purification by reprecipitation and redissolution were conducted.

Subsequently, 1.4 millimoles of Compound (A2) dissolved in 10 milliliters of toluene was added to the solution obtained and the resulting mixture was then subjected to reaction with stirring at 100° C. for 90 minutes while a hydrogen gas was fed at a pressure of 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLE 39

In the same manner as in Example 8, polymerization, purification by reprecipitation and redissolution were conducted.

Subsequently, 1.4 millimoles of Compound (A13) dissolved in 10 milliliters of toluene was added to the solution obtained and the resulting mixture was then subjected to reaction with stirring at 100° C. for 90 minutes while a hydrogen gas was fed at a pressure of 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLE 40

In the same manner as in Example 8, polymerization, purification by reprecipitation and redissolution were conducted.

Subsequently, 1.4 millimoles of Compound (A16) dissolved in 10 milliliters of toluene was added to the solution obtained and the resulting mixture was then subjected to reaction with stirring at 100° C. for 90 minutes while a hydrogen gas was fed at a pressure of 8.0 kg/cm$^2$.

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

EXAMPLES 41 TO 44

Polymerization and hydrogenation were conducted in the same manner as in Example 1, except that Compound (A16), (A17), (A18) or (A19) was substituted for the Compound (A1).

The reaction products obtained were polymers each having a degree of hydrogenation in the butadiene portion of 98% as measured by $^1$H-NMR spectrum (100 MHz), in which polymers the degree of hydrogenation was substantially not hydrogenated.

EXAMPLE 45

Polymerization and hydrogenation were conducted in the same manner as in Example 1, except that Compound (A1) having added thereto 700 millimoles of butadiene as a catalyst stabilizer was substituted for the Compound (A1).

The reaction product obtained was a polymer having a degree of hydrogenation in the butadiene portion of 98% as measured by $^1$H-NMR spectrum (100 MHz), in which polymer the unsaturated bonds of the aromatic rings were substantially not hydrogenated.

The above results are shown in Table 2.

Comparative Example 1

Polymerization and hydrogenation were conducted in the same manner as in Example 1, except that Compound (a1) was substituted for the Compound (A1).

The reaction product obtained was a polymer having a degree of hydrogenation in the butadiene portion of 25% as measured by $^1$H-NMR spectrum (100 MHz), namely the degree of hydrogenation was remarkably low.

The above results are shown in Table 3.

Comparative Example 2

Polymerization and hydrogenation were conducted in the same manner as in Example 1, except that Compound (a2) was substituted for the Compound (A1).

The reaction product obtained was a polymer having a degree of hydrogenation in the butadiene portion of 55% as measured by $^1$H-NMR spectrum (100 MHz), namely the degree of hydrogenation in the butadiene portion was remarkably low.

The above results are shown in Table 3.

Comparative Example 3

Polymerization and hydrogenation were conducted in the same manner as in Example 1, except that Compound (a3) was substituted for the Compound (A1).

The reaction product obtained was a polymer having a degree of hydrogenation in the butadiene portion of 45% as measured by $^1$H-NMR spectrum (100 MHz), namely the degree of hydrogenation was remarkably low.

The above results are shown in Table 3.

Comparative Example 4

Polymerization and hydrogenation were conducted in the same manner as in Example 1, except that Compound (a4) was substituted for the Compound (A1).

The reaction product obtained was a polymer having a degree of hydrogenation in the butadiene portion of 35% as measured by $^1$H-NMR spectrum (100 MHz), namely the degree of hydrogenation was remarkably low.

The above results are shown in Table 3.

Comparative Example 5

After polymerization was conducted in the same manner as in Example 1, a hydrogen gas was fed to the autoclave in excess of the number of moles of the living lithium, and the mixture was then stirred for about 2 hours to be subjected to reaction until the amount of the living lithium became nil, thereby producing 13.76 millimoles of lithium hydride.

Subsequently, 1.6 millimoles of Compound (a5) dissolved in 10 milliliters of toluene was fed to the autoclave in a nitrogen atmosphere and the resulting mixture was then subjected to reaction with stirring at 100° C. for 250 minutes while a hydrogen gas was fed at a pressure of 8.0 kg/cm$^2$.

The reaction product obtained was a polymer having a degree of hydrogenation in the butadiene portion of 96% as measured by $^1$H-NMR spectrum (100 MHz), and a longer period of reaction time was required than in Example 1.

The above results are shown in Table 3.

Comparative Example 6

In the same manner as in Example 8, polymerization, purification by reprecipitation and redissolution were conducted.

Subsequently, 13.76 millimoles of 2,6-di-t-butyl-4-methylphenoxylithium [this compound is referred to hereinafter as Compound (b1)] was added to the solution obtained and the resulting mixture was then stirred, after which 100 milliliters of a toluene solution containing 1.6 millimoles of bis(cyclopentadienyl)titanium dichloride [this compound is referred to hereinafter as Compound (a6)] was added to the mixture. The resulting mixture was stirred and thereafter subjected to reaction with stirring at 100° C. for 60 minutes while a hydrogen gas was fed at a pressure of 8.0 kg/cm$^2$.

The reaction product obtained was a polymer having a degree of hydrogenation in the butadiene portion of 90% as measured by $^1$H-NMR spectrum (100 MHz), namely the catalytic activity was insufficient.

The above results are shown in Table 3.

In Tables 1 and 2, other components than Compounds (A1) to (A20), Compounds (a1) to (a6) and Compound (b1) which are constituents of the hydrogenation catalyst were as follows:

B1: Lithium hydride.
B2: Lithium-terminated styrene/1,3-butadiene copolymer (living polymer).
B3: Triethylaluminum.
B4: Dimethylmagnesium.
B5: n-Butyllithium.
B6: Carboxylithium-terminated styrene/1,3-butadiene copolymer obtained by reaction between carbon dioxide and lithium-terminated styrene/1,3-butadiene copolymer (living polymer).
C1: Benzophenone.
C2: Ethanol.
C3: Acetone.

TABLE 1

| Example No. | Catalyst constituents | | | Reaction conditions | | | Degree of hydro- genation (%) |
|---|---|---|---|---|---|---|---|
| | Constituent (A) (mmol.) | Constituent (B) (mmol.) | Constituent (C) (mmol.) | Pressure (kg/cm$^2$) | Temp. (C.°) | Time (min) | |
| 1 | A1 (1.6) | B1 (13.76) | — | 8.0 | 100 | 90 | 99 |
| 2 | A1 (1.6) | B1 (1.4) | — | 8.0 | 100 | 90 | 99 |
| 3 | A1 (1.6) | B2 (4.29) | — | 8.0 | 100 | 80 | 99 |
| 4 | A1 (1.5) | B6 (4.29) | — | 8.0 | 100 | 80 | 98 |
| 5 | A1 (1.5) | B2 (4.29) | C1 (4.29) | 8.0 | 100 | 80 | 99 |
| 6 | A1 (0.15) | B1 (4.3) | — | 8.0 | 110 | 180 | 96 |
| 7 | A1 (35) | B1 (4.3) | — | 8.0 | 100 | 20 | 99 |
| 8 | A1 (1.4) | B3 (2.8) | — | 8.0 | 100 | 70 | 99 |
| 9 | A1 (1.4) | B4 (2.8) | — | 8.0 | 90 | 80 | 99 |
| 10 | A1 (1.4) | B5 (28) | — | 8.0 | 90 | 40 | 98 |
| 11 | A1 (1.4) | B5 (0.7) | — | 8.0 | 100 | 90 | 99 |
| 12 | A1 (1.4) | B5 (2.8) | C2 (2.8) | 8.0 | 100 | 70 | 99 |
| 13 | A1 (1.4) | B5 (2.8) | C3 (2.8) | 8.0 | 110 | 60 | 98 |
| 14 | A1 (1.4) | B5 (2.8) | C1 (0.056) | 8.0 | 100 | 60 | 98 |
| 15 | A1 (1.4) | B5 (2.8) | C1 (15) | 8.0 | 100 | 180 | 96 |
| 16 | A2 (1.6) | B1 (13.76) | — | 8.0 | 100 | 90 | 99 |
| 17 | A3 (1.6) | B1 (13.76) | — | 8.0 | 100 | 90 | 98 |
| 18 | A4 (1.6) | B1 (13.76) | — | 8.0 | 100 | 90 | 99 |
| 19 | A5 (1.6) | B1 (13.76) | — | 8.0 | 100 | 90 | 98 |
| 20 | A6 (1.6) | B1 (13.76) | — | 8.0 | 100 | 90 | 99 |
| 21 | A7 (1.6) | B1 (13.76) | — | 8.0 | 100 | 90 | 99 |
| 22 | A8 (1.6) | B1 (13.76) | — | 8.0 | 100 | 90 | 99 |
| 23 | A9 (1.6) | B1 (13.76) | — | 8.0 | 100 | 90 | 99 |
| 24 | A1 (*1) (1.6) | B1 (13.76) | — | 8.0 | 100 | 90 | 99 |
| 25 | A1 (1.6) | B1 (13.76) | — | 8.0 | 130 | 60 | 98 |
| 26 | A10 (1.6) | B1 (1.4) | — | 8.0 | 90 | 90 | 99 |

Note:
*1: Constituent stored at room temperature for 6 months.

TABLE 2

| Example No. | Catalyst constituents | | | Reaction conditions | | | Degree of hydro- genation (%) |
|---|---|---|---|---|---|---|---|
| | Constituent (A) (mmol.) | Constituent (B) (mmol.) | Constituent (C) (mmol.) | Pressure (kg/cm$^2$) | Temp. (C.°) | Time (min) | |
| 27 | A11 (1.6) | B1 (13.76) | — | 8.0 | 100 | 90 | 99 |
| 28 | A12 (1.6) | B1 (13.76) | — | 8.0 | 100 | 90 | 99 |
| 29 | A13 (1.6) | B1 (13.76) | — | 8.0 | 100 | 90 | 99 |
| 30 | A14 (1.6) | B1 (13.76) | — | 8.0 | 100 | 90 | 98 |
| 31 | A15 (1.6) | B1 (13.76) | — | 8.0 | 100 | 90 | 98 |
| 32 | A20 (1.6) | B1 (13.76) | — | 8.0 | 100 | 90 | 99 |
| 33 | A21 (1.6) | B1 (13.76) | — | 8.0 | 100 | 90 | 99 |
| 34 | A22 (1.6) | B1 (13.76) | — | 8.0 | 100 | 90 | 98 |
| 35 | A23 (1.6) | B1 (13.76) | — | 8.0 | 100 | 90 | 99 |
| 36 | A24 (1.6) | B1 (13.76) | — | 8.0 | 100 | 90 | 99 |
| 37 | A1 (1.4) | — | — | 8.0 | 100 | 90 | 98 |
| 38 | A2 (1.4) | — | — | 8.0 | 100 | 90 | 98 |
| 39 | A13 (1.4) | — | — | 8.0 | 100 | 90 | 98 |
| 40 | A20 (1.4) | — | — | 8.0 | 100 | 90 | 98 |
| 41 | A16 (1.6) | B1 (13.76) | — | 8.0 | 100 | 90 | 98 |
| 42 | A17 (1.6) | B1 (13.76) | — | 8.0 | 100 | 90 | 98 |
| 43 | A18 (1.6) | B1 (13.76) | — | 8.0 | 100 | 90 | 98 |

TABLE 2-continued

| Example No. | Catalyst constituents | | | Reaction conditions | | | Degree of hydrogenation (%) |
|---|---|---|---|---|---|---|---|
| | Constituent (A) (mmol.) | Constituent (B) (mmol.) | Constituent (C) (mmol.) | Pressure (kg/cm²) | Temp. (C.°) | Time (min) | |
| 44 | A19 (1.6) | B1 (13.76) | — | 8.0 | 100 | 90 | 98 |
| 45 | A1 (1.6)* | B1 (13.76) | — | 8.0 | 100 | 90 | 98 |

Note:
*700 millimoles of butadiene was further added as catalyst stabilizer.

TABLE 3

| Comparative Example No. | Catalyst constituents | | | Reaction conditions | | | Degree of hydrogenation (%) |
|---|---|---|---|---|---|---|---|
| | Transition metal compound (mmol.) | Lithium compound (mmol.) | Constitutent (C) (mmol.) | Pressure (kg/cm²) | Temp. (C.°) | Time (min) | |
| 1 | a1 (1.6) | B1 (13.76) | — | 8.0 | 100 | 90 | 25 |
| 2 | a2 (1.6) | B1 (13.76) | — | 8.0 | 100 | 90 | 55 |
| 3 | a3 (1.6) | B1 (13.76) | — | 8.0 | 100 | 90 | 45 |
| 4 | a4 (1.6) | B1 (13.76) | — | 8.0 | 100 | 90 | 35 |
| 5 | a5 (1.6) | B1 (13.76) | — | 8.0 | 100 | 250 | 96 |
| 6 | a6 (1.6) | B1 (13.76) | — | 8.0 | 100 | 60 | 90 |

What is claimed is:

1. A process for hydrogenating an olefinically unsaturated compound, which comprises contacting an olefinically unsaturated compound with hydrogen in the presence of a hydrogenation catalyst in an inert, organic solvent, wherein the hydrogenation catalyst comprises the following constituent (A):

Constituent (A): at least one member selected from the group consisting of compounds represented by the following general formulas (1) and (2):

(1)

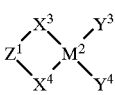
(2)

wherein $M^1$ represents a titanium atom, a zirconium atom or a hafnium atom; each of $X^1$ and $X^2$ represents independently a monovalent hydrocarbon group having 5 to 20 carbon atoms and having a cyclopentadiene skeleton and is bonded to $M^1$ in its cyclopentadiene skeleton portion; $Y^1$ represents a halogen atom or a monovalent organic group having 3 to 20 carbon atoms and having a heterocyclic skeleton which group is covalently bonded to $M^1$ through an oxygen atom or a nitrogen atom thereof; and $Y^2$ represents a monovalent organic group having 3 to 20 carbon atoms and having a heterocyclic skeleton which group is covalently bonded to $M^1$ through an oxygen atom or a nitrogen atom thereof, wherein $M^2$ represents a titanium atom, a zirconium atom or a hafnium atom; each of $X^3$ and $X^4$ represents independently a divalent hydrocarbon group having 5 to 20 carbon atoms and having a cyclopentadiene skeleton and is bonded to $M^2$ in its cyclopentadiene skeleton portion; $Z^1$ represents a divalent hydrocarbon group having 1 to 3 carbon atoms, a (poly)silylene group having 1 to 3 silicon atoms or a (poly)siloxanylene group having 1 to 3 silicon atoms; $Y^3$ represents a halogen atom or a monovalent organic group having 3 to 20 carbon atoms and having a heterocyclic skeleton which group is covalently bonded to $M^2$ through an oxygen atom or a nitrogen atom thereof; and $Y^4$ represents a monovalent organic group having 3 to 20 carbon atoms and having a heterocyclic skeleton which group is covalently bonded to $M^2$ through an oxygen atom or a nitrogen atom thereof.

2. The process according to claim 1, wherein the olefinically unsaturated compound is a conjugated diene polymer.

3. The process according to claim 1, wherein the amount of the constituent (A) is 0.001 to 50 millimoles in terms of the transition metal, per 100 g of the olefinically unsaturated compound.

4. The process according to claim 1, wherein the heterocyclic skeleton in the definitions of $Y^1$ to $Y^4$ has an oxygen atom as its hetero atom.

5. The process according to claim 1, wherein each of $Y^1$ to $Y^4$ is furfuryl alcohol or tetrahydrofurfuryl alcohol.

6. The process according to claim 1, wherein the catalyst additionally comprises the following constituent (B):

Constituent (B): at least one member selected from the group consisting of organic compounds, halides and hydrides of metals of Groups I to III of the Periodic Table.

7. The process according to claim 6, wherein the constituent (B) is selected from the group consisting of lithium hydride and organic compounds of lithium and aluminum.

8. The process according to claim 6, wherein the constituent (A)/constituent (B) ratio is 0.5 to 15.

9. A process for hydrogenating an olefinically unsaturated compound, which comprises contacting an olefinically unsaturated compound with hydrogen in the presence of a hydrogenation catalyst in an inert, organic solvent, wherein the hydrogenation catalyst comprises (A') a component obtained by subjecting to reaction at least one compound represented by the following general formula (4) or (5) and at least one compound represented by the following general formula (3) obtained by reacting a heterocyclic compound having 3 to 20 carbon atoms and having a hydroxyl group, a carbonyl group or a secondary amino group with lithium hydride or an organolithium compound:

$$Li-Y^5 \tag{3}$$

wherein $Y^5$ represents a monovalent, organic group having 3 to 20 carbon atoms and having a heterocyclic skeleton which group is covalently bonded to the lithium atom through an oxygen atom or a nitrogen atom thereof,

(4)

wherein $M^3$ represents a titanium atom, a zirconium atom or a hafnium atom; each of $X^5$ and $X^6$ represents independently a monovalent hydrocarbon group having 5 to 20 carbon atoms and having a cyclopentadiene skeleton and is bonded to $M^3$ in its cyclopentadiene skeleton portion; and each of $A^1$ and $A^2$ represents independently a chlorine atom, a bromine atom or an iodine atom,

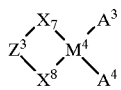
(5)

wherein $M^4$ represents a titanium atom, a zirconium atom or a hafnium atom; each of $X^7$ and $X^8$ represents independently a divalent hydrocarbon group having 5 to 20 carbon atoms and having a cyclopentadiene skeleton and is bonded to $M^4$ in its cyclopentadiene skeleton portion; $Z^3$ represents a divalent hydrocarbon group having 1 to 3 carbon atoms, a (poly)silylene group having 1 to 3 silicon atoms or a (poly)siloxanylene group having 1 to 3 silicon atoms; and each of $A^3$ and $A^4$ represents independently a chlorine atom, a bromine atom or an iodine atom.

10. The process according to claim 9, wherein the heterocyclic skeleton in the definitions of $Y^5$ has an oxygen atom as its hetero atom.

11. The process according to claim 9, wherein $Y^5$ is furfuryl alcohol or tetrahydrofurfuryl alcohol.

12. The process according to claim 9, wherein the catalyst additionally comprises the following constituent (B):

Constituent (B): at least one member selected from the group consisting of organic compounds, halides and hydrides of metals of Groups I to III of the Periodic Table.

13. The process according to claim 12, wherein the constituent (B) is selected from the group consisting of lithium hydride and organic compounds of lithium and aluminum.

14. The process according to claim 12, wherein the constituent (A')/constituent (B) ratio is 0.5 to 15.

15. A process for hydrogenating an olefinically unsaturated compound, which comprises contacting an olefinically unsaturated compound with hydrogen in the presence of a hydrogenation catalyst in an inert, organic solvent, wherein the hydrogenation catalyst comprises the following constituent (A):

Constituent (A): at least one member selected from the group consisting of compounds represented by the following general formulas (1) and (2):

(1)

wherein $M^1$ represents a titanium atom, a zirconium atom or a hafnium atom; each of $X^1$ and $X^2$ represents independently a monovalent hydrocarbon group having 5 to 20 carbon atoms and having a cyclopentadiene skeleton and is bonded to $M^1$ in its cyclopentadiene skeleton portion; $Y^1$ represents a halogen atom or a monovalent organic group having 3 to 20 carbon atoms and having a heterocyclic skeleton which group is covalently bonded to $M^1$ through an oxygen atom or a nitrogen atom thereof; and $Y^2$ represents a monovalent organic group having 3 to 20 carbon atoms and having a heterocyclic skeleton which group is covalently bonded to $M^1$ through an oxygen atom or a nitrogen atom thereof,

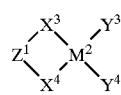
(2)

wherein $M^2$ represents a titanium atom, a zirconium atom or a hafnium atom; each of $X^3$ and $X^4$ represents independently a divalent hydrocarbon group having 5 to 20 carbon atoms and having a cyclopentadiene skeleton and is bonded to $M^2$ in its cyclopentadiene skeleton portion; $Z^1$ represents a divalent hydrocarbon group having 1 to 3 carbon atoms, a (poly)silylene group having 1 to 3 silicon atoms or a (poly)siloxanylene group having 1 to 3 silicon atoms; $Y^3$ represents a halogen atom or a monovalent organic group having 3 to 20 carbon atoms and having a heterocyclic skeleton which group is covalently bonded to $M^2$ through an oxygen atom or a nitrogen atom thereof; and $Y^4$ represents a monovalent organic group having 3 to 20 carbon atoms and having a heterocyclic skeleton which group is covalently bonded to $M^2$ through an oxygen atom or a nitrogen atom thereof; and/or the following constituent (A'):

Constituent (A'): a component obtained by subjecting to reaction at least one compound represented by the following general formula (4) or (5) and at least one compound represented by the following general formula (3) obtained by reacting a heterocyclic compound having 3 to 20 carbon atoms and having a hydroxyl group, a carbonyl group or a secondary amino group with lithium hydride or an organolithium compound:

 (3)

wherein $Y^5$ represents a monovalent, organic group having 3 to 20 carbon atoms and having a heterocyclic skeleton which group is covalently bonded to the lithium atom through an oxygen atom or a nitrogen atom thereof,

 (4)

wherein $M^3$ represents a titanium atom, a zirconium atom or a hafnium atom; each of $X^5$ and $X^6$ represents independently a monovalent hydrocarbon group having 5 to 20 carbon atoms and having a cyclopentadiene skeleton and is bonded to $M^3$ in its cyclopentadiene skeleton portion; and each of $A^1$ and $A^2$ represents independently a chlorine atom, a bromine atom or an iodine atom,

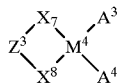 (5)

wherein $M^4$ represents a titanium atom, a zirconium atom or a hafnium atom; each of $X^7$ and $X^8$ represents independently a divalent hydrocarbon group having 5 to 20 carbon atoms and having a cyclopentadiene skeleton and is bonded to $M^4$ in its cyclopentadiene skeleton portion; $Z^3$ represents a divalent hydrocarbon group having 1 to 3 carbon atoms, a (poly)silylene group having 1 to 3 silicon atoms or a (poly)siloxanylene group having 1 to 3 silicon atoms; and each of $A^3$ and $A^4$ represents independently a chlorine atom, a bromine atom or an iodine atom; the following constituent (B):

Constituent (B): at least one member selected from the group consisting of organic compounds, halides and hydrides of metals of Groups I to III of the Periodic Table; and the following constituent (C):

(C) at least one member selected from the group consisting of alcohol compounds, carboxylic acid compounds, chain ester compounds, lactone compounds, ether compounds, thioether compounds, ketone compounds, aldehyde compounds, sulfoxide compounds, amine compounds, amide compounds, nitrile compounds, epoxy compounds and oxime compounds.

16. The process according to claim 15, wherein the constituent (C) is selected from the group consisting of alcohol compounds and ketone compounds.

17. The process according to claim 15, wherein the constituent (A)/constituent (B) ratio or the constituent (A')/constituent (B) ratio is 0.5 to 15, and the constituent (B)/constituent (C) ratio is 0.05 to 15.

18. The process according to claim 1, wherein said heterocyclic skeleton is not directly bonded to $M^1$ or $M^2$ through an oxygen atom in the heterocyclic skeleton.

19. The process according to claim 2, wherein said heterocyclic skeleton is not directly bonded to $M^1$ or $M^2$ through an oxygen atom in the heterocyclic skeleton.

20. The process according to claim 3, wherein said heterocyclic skeleton is not directly bonded to $M^1$ or $M^2$ through an oxygen atom in the heterocyclic skeleton.

21. The process according to claim 4, wherein said heterocyclic skeleton is not directly bonded to $M^1$ or $M^2$ through an oxygen atom in the heterocyclic skeleton.

22. The process according to claim 5, wherein said heterocyclic skeleton is not directly bonded to $M^1$ or $M^2$ through an oxygen atom in the heterocyclic skeleton.

23. The process according to claim 6, wherein said heterocyclic skeleton is not directly bonded to $M^1$ or $M^2$ through an oxygen atom in the heterocyclic skeleton.

24. The process according to claim 7, wherein said heterocyclic skeleton is not directly bonded to $M^1$ or $M^2$ through an oxygen atom in the heterocyclic skeleton.

25. The process according to claim 8, wherein said heterocyclic skeleton is not directly bonded to $M^1$ or $M^2$ through an oxygen atom in the heterocyclic skeleton.

26. The process according to claim 15, wherein said heterocyclic skeleton is not directly bonded to $M^1$ or $M^2$ through an oxygen atom in the heterocyclic skeleton.

27. The process according to claim 16, wherein said heterocyclic skeleton is not directly bonded to $M^1$ or $M^2$ through an oxygen atom in the heterocyclic skeleton.

28. The process according to claim 17, wherein the heterocyclic skeleton is not directly bonded to $M^1$ or $M^2$ through an oxygen atom in the heterocyclic skeleton.

* * * * *